(12) United States Patent
Abbott et al.

(10) Patent No.: US 7,779,015 B2
(45) Date of Patent: Aug. 17, 2010

(54) LOGGING AND ANALYZING CONTEXT ATTRIBUTES

(75) Inventors: Ken Abbott, Kirkland, WA (US); Josh Freedman, Mercer Island, WA (US); Dan Newell, Medina, WA (US); Jim Robarts, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 10/984,511

(22) Filed: Nov. 8, 2004

(65) Prior Publication Data

US 2005/0086243 A1    Apr. 21, 2005

Related U.S. Application Data

(63) Continuation of application No. 09/541,326, filed on Apr. 2, 2000, now abandoned, and a continuation-in-part of application No. 09/464,659, filed on Dec. 15, 1999, now Pat. No. 6,513,046, which is a continuation-in-part of application No. 09/216,193, filed on Dec. 18, 1998, now Pat. No. 6,466,232.

(51) Int. Cl.
*G06F 17/30* (2006.01)
(52) U.S. Cl. .................. 707/754; 707/804; 707/921; 707/941; 707/962; 702/127
(58) Field of Classification Search .................. None
See application file for complete search history.

(56) References Cited

U.S. PATENT DOCUMENTS

| | | | |
|---|---|---|---|
| 3,973,251 A * | 8/1976 | Stephans | 340/309.7 |
| 4,283,712 A * | 8/1981 | Goody | 377/5 |
| 4,458,331 A | 7/1984 | Amezcua et al. | |
| 4,569,026 A | 2/1986 | Best | |
| 4,815,030 A | 3/1989 | Cross et al. | |
| 4,905,163 A | 2/1990 | Garber et al. | |
| 4,970,683 A | 11/1990 | Harshaw et al. | |

(Continued)

FOREIGN PATENT DOCUMENTS

EP    0661627 A1    7/1995

(Continued)

OTHER PUBLICATIONS

Bishop, Todd., "Hard ware", Jul. 28, 2000, Puget Sound Business Journal, print edition, pp. 1-4.*

(Continued)

*Primary Examiner*—Pierre M Vital
*Assistant Examiner*—Christopher P Nofal
(74) *Attorney, Agent, or Firm*—Wolf, Greenfield & Sacks, P.C.

(57) ABSTRACT

A facility for logging context attributes is described. For each of a set of selected context attributes, the facility determines a target frequency with which values of the selected context attribute are to be logged. For each of the set of selected context attributes, the facility obtains values of the selected context attribute at a frequency approximating the target frequency determined for the selected context attribute. Then, for each obtained context attribute value, the facility writes the obtained value to a storage device in a manner that identifies its context attribute.

32 Claims, 10 Drawing Sheets

U.S. PATENT DOCUMENTS

| | | |
|---|---|---|
| 4,991,087 A | 2/1991 | Burkowski et al. |
| 5,032,083 A | 7/1991 | Friedman .................... 434/112 |
| 5,133,075 A | 7/1992 | Risch |
| 5,201,034 A | 4/1993 | Matsuura et al. ............ 395/155 |
| 5,208,449 A | 5/1993 | Eastman et al. ............. 235/462 |
| 5,214,757 A | 5/1993 | Mauney et al. .............. 395/161 |
| 5,227,614 A | 7/1993 | Danielson et al. ........... 235/380 |
| 5,237,684 A | 8/1993 | Record et al. |
| 5,251,294 A | 10/1993 | Abelow |
| 5,267,147 A | 11/1993 | Harshaw et al. |
| 5,278,946 A | 1/1994 | Shimada et al. |
| 5,285,398 A | 2/1994 | Janik |
| 5,317,568 A | 5/1994 | Bixby et al. ................ 370/85.6 |
| 5,327,529 A | 7/1994 | Fults et al. |
| 5,335,276 A | 8/1994 | Thompson et al. ............. 380/21 |
| 5,339,395 A | 8/1994 | Pickett et al. |
| 5,353,399 A | 10/1994 | Kuwamoto et al. |
| 5,388,198 A | 2/1995 | Layman et al. ............. 395/155 |
| 5,398,021 A | 3/1995 | Moore |
| 5,416,730 A | 5/1995 | Lookofsky ............... 364/708.1 |
| 5,454,074 A | 9/1995 | Hartel et al. |
| 5,470,233 A | 11/1995 | Fruchterman et al. ....... 434/112 |
| 5,471,629 A | 11/1995 | Risch |
| 5,481,667 A | 1/1996 | Bieniek et al. |
| 5,493,692 A | 2/1996 | Theimer et al. ............. 455/26.1 |
| 5,506,580 A | 4/1996 | Whiting et al. ............... 341/51 |
| 5,513,646 A | 5/1996 | Lehrman et al. |
| 5,522,026 A | 5/1996 | Records et al. |
| 5,535,323 A | 7/1996 | Miller et al. |
| 5,537,618 A | 7/1996 | Boulton et al. |
| 5,539,665 A | 7/1996 | Lamming et al. ....... 364/514 R |
| 5,544,321 A | 8/1996 | Theimer et al. ........ 395/200.11 |
| 5,553,609 A | 9/1996 | Chen et al. .................. 128/630 |
| 5,555,376 A | 9/1996 | Theimer et al. ........ 395/200.09 |
| 5,559,520 A | 9/1996 | Barzegar et al. ............ 342/357 |
| 5,568,645 A | 10/1996 | Morris et al. ................ 395/800 |
| 5,572,401 A | 11/1996 | Carroll |
| 5,592,664 A | 1/1997 | Starkey |
| 5,601,435 A | 2/1997 | Quy ........................ 434/307 R |
| 5,603,054 A | 2/1997 | Theimer et al. ............. 395/826 |
| 5,611,050 A | 3/1997 | Theimer et al. ........ 395/200.09 |
| 5,642,303 A | 6/1997 | Small et al. ............. 364/705.05 |
| 5,646,629 A | 7/1997 | Loomis et al. .............. 342/357 |
| 5,659,746 A | 8/1997 | Bankert et al. |
| 5,689,619 A | 11/1997 | Smyth |
| 5,689,708 A | 11/1997 | Regnier et al. |
| 5,701,894 A | 12/1997 | Cherry et al. |
| 5,704,366 A | 1/1998 | Tacklind et al. ............. 128/716 |
| 5,710,884 A | 1/1998 | Dedrick |
| 5,715,451 A | 2/1998 | Marlin ........................ 395/615 |
| 5,717,747 A | 2/1998 | Boyle, III et al. |
| 5,719,744 A | 2/1998 | Jenkins et al. ............... 361/683 |
| 5,726,660 A | 3/1998 | Purdy et al. ................. 342/357 |
| 5,726,688 A | 3/1998 | Siefert et al. |
| 5,740,037 A | 4/1998 | McCann et al. |
| 5,745,110 A | 4/1998 | Ertemalp |
| 5,751,260 A | 5/1998 | Nappi et al. .................... 345/8 |
| 5,752,019 A | 5/1998 | Rigoutsos et al. |
| 5,761,662 A | 6/1998 | Dasan |
| 5,781,913 A | 7/1998 | Felsenstein et al. .......... 707/501 |
| 5,787,234 A | 7/1998 | Molloy |
| 5,787,279 A | 7/1998 | Rigoutsos |
| 5,790,974 A | 8/1998 | Tognazzini .................. 701/204 |
| 5,796,952 A | 8/1998 | Davis et al. |
| 5,798,733 A | 8/1998 | Ethridge ...................... 342/357 |
| 5,812,865 A * | 9/1998 | Theimer et al. ............. 709/228 |
| 5,818,446 A | 10/1998 | Bertram et al. |
| 5,826,253 A | 10/1998 | Bredenberg |
| 5,831,594 A | 11/1998 | Tognazzini et al. |
| 5,832,296 A | 11/1998 | Wang et al. |
| 5,835,087 A * | 11/1998 | Herz et al. ................... 715/810 |
| 5,852,814 A | 12/1998 | Allen |
| 5,873,070 A | 2/1999 | Bunte et al. ................... 705/28 |
| 5,878,274 A | 3/1999 | Kono et al. .................. 395/828 |
| 5,879,163 A | 3/1999 | Brown et al. |
| 5,899,963 A | 5/1999 | Hutchings ................... 702/145 |
| 5,902,347 A | 5/1999 | Backman et al. ............ 701/200 |
| 5,905,492 A | 5/1999 | Straub et al. |
| 5,910,799 A | 6/1999 | Carpenter et al. ........... 345/333 |
| 5,911,132 A | 6/1999 | Sloane |
| 5,913,030 A | 6/1999 | Lotspiech et al. |
| 5,924,074 A | 7/1999 | Evans ............................ 705/3 |
| 5,937,160 A * | 8/1999 | Davis et al. .................. 709/203 |
| 5,938,721 A | 8/1999 | Dussell et al. ............... 701/211 |
| 5,942,986 A | 8/1999 | Shabot et al. |
| 5,945,988 A | 8/1999 | Williams et al. |
| 5,948,041 A | 9/1999 | Abo et al. .................... 701/207 |
| 5,953,718 A | 9/1999 | Wical |
| 5,959,611 A | 9/1999 | Smailagic et al. ........... 345/156 |
| 5,966,126 A | 10/1999 | Szabo |
| 5,966,533 A | 10/1999 | Moody ........................ 395/702 |
| 5,966,710 A | 10/1999 | Burrows |
| 5,971,580 A | 10/1999 | Hall et al. |
| 5,974,262 A | 10/1999 | Fuller et al. |
| 5,977,968 A | 11/1999 | Le Blanc |
| 5,983,335 A | 11/1999 | Dwyer, III ..................... 712/23 |
| 5,991,687 A | 11/1999 | Hale et al. ................... 701/207 |
| 5,991,735 A | 11/1999 | Gerace |
| 5,995,956 A | 11/1999 | Nguyen |
| 5,999,932 A | 12/1999 | Paul |
| 5,999,943 A | 12/1999 | Nori et al. |
| 5,999,975 A | 12/1999 | Kittaka et al. |
| 6,003,082 A | 12/1999 | Gampper et al. |
| 6,006,251 A | 12/1999 | Toyouchi et al. |
| 6,012,152 A | 1/2000 | Douik et al. |
| 6,014,638 A | 1/2000 | Burge et al. ................... 705/27 |
| 6,023,729 A | 2/2000 | Samuel et al. |
| 6,041,331 A | 3/2000 | Weiner et al. |
| 6,041,365 A | 3/2000 | Kleinerman |
| 6,044,415 A | 3/2000 | Futral et al. |
| 6,047,301 A | 4/2000 | Bjorklund et al. ........... 708/139 |
| 6,047,327 A | 4/2000 | Tso et al. |
| 6,055,516 A | 4/2000 | Johnson et al. |
| 6,064,943 A | 5/2000 | Clark, Jr. et al. ............... 702/2 |
| 6,067,084 A | 5/2000 | Fado et al. |
| 6,081,814 A | 6/2000 | Mangat et al. |
| 6,085,086 A | 7/2000 | La Porta et al. |
| 6,088,689 A | 7/2000 | Kohn et al. |
| 6,091,411 A | 7/2000 | Straub et al. |
| 6,092,101 A | 7/2000 | Birrell et al. |
| 6,094,625 A | 7/2000 | Ralston |
| 6,098,065 A | 8/2000 | Skillen et al. |
| 6,105,063 A | 8/2000 | Hayes, Jr. |
| 6,108,197 A | 8/2000 | Janik .......................... 361/683 |
| 6,108,665 A | 8/2000 | Bair et al. |
| 6,112,246 A | 8/2000 | Horbal et al. |
| 6,122,348 A | 9/2000 | French-St. George et al. |
| 6,122,960 A | 9/2000 | Hutchings et al. ............. 73/493 |
| 6,127,990 A | 10/2000 | Zwern ........................... 345/8 |
| 6,131,067 A | 10/2000 | Girerd et al. |
| 6,134,532 A | 10/2000 | Lazarus et al. |
| 6,154,745 A | 11/2000 | Kari et al. |
| 6,155,960 A | 12/2000 | Roberts et al. |
| 6,164,541 A | 12/2000 | Dougherty et al. |
| 6,169,976 B1 | 1/2001 | Colosso |
| 6,185,534 B1 | 2/2001 | Breese et al. |
| 6,188,399 B1 | 2/2001 | Voas et al. |
| 6,195,622 B1 | 2/2001 | Altschuler et al. ............. 703/2 |
| 6,198,394 B1 | 3/2001 | Jacobsen et al. |
| 6,199,099 B1 | 3/2001 | Gershman et al. |
| 6,215,405 B1 | 4/2001 | Handley et al. |
| 6,218,958 B1 | 4/2001 | Eichstaedt et al. |
| 6,230,111 B1 | 5/2001 | Mizokawa .................. 702/182 |
| 6,236,768 B1 | 5/2001 | Rhodes et al. |

| Patent | Date | Inventor | |
|---|---|---|---|
| 6,256,633 B1 | 7/2001 | Dharap | |
| 6,262,720 B1 | 7/2001 | Jeffrey et al. | |
| 6,263,268 B1 | 7/2001 | Nathanson | |
| 6,263,317 B1 | 7/2001 | Sharp et al. | |
| 6,272,470 B1 * | 8/2001 | Teshima | 705/3 |
| 6,272,507 B1 | 8/2001 | Pirolli et al. | |
| 6,282,517 B1 | 8/2001 | Wolfe et al. | |
| 6,285,757 B1 | 9/2001 | Carroll et al. | |
| 6,285,889 B1 | 9/2001 | Nykanen et al. | |
| 6,289,316 B1 * | 9/2001 | Aghili et al. | 705/3 |
| 6,289,513 B1 * | 9/2001 | Bentwich | 717/106 |
| 6,292,796 B1 | 9/2001 | Drucker et al. | |
| 6,294,953 B1 | 9/2001 | Steeves | 329/341 |
| 6,305,007 B1 * | 10/2001 | Mintz | 717/116 |
| 6,305,221 B1 | 10/2001 | Hutchings | 73/488 |
| 6,308,203 B1 | 10/2001 | Itabashi et al. | |
| 6,311,162 B1 * | 10/2001 | Reichwein et al. | 705/1 |
| 6,314,384 B1 * | 11/2001 | Goetz | 702/177 |
| 6,317,718 B1 | 11/2001 | Fano | |
| 6,321,158 B1 | 11/2001 | DeLorme et al. | |
| 6,321,279 B1 | 11/2001 | Bonola | |
| 6,327,535 B1 | 12/2001 | Evans et al. | |
| 6,349,307 B1 | 2/2002 | Chen | |
| 6,353,398 B1 | 3/2002 | Amin et al. | |
| 6,353,823 B1 | 3/2002 | Kumar | |
| 6,356,905 B1 | 3/2002 | Gershman et al. | |
| 6,363,377 B1 | 3/2002 | Kravets et al. | |
| 6,385,589 B1 | 5/2002 | Trusheim et al. | |
| 6,392,670 B1 | 5/2002 | Takeuchi et al. | |
| 6,401,085 B1 | 6/2002 | Gershman et al. | |
| 6,405,159 B2 | 6/2002 | Bushey et al. | 703/13 |
| 6,405,206 B1 | 6/2002 | Kayahara | |
| 6,418,424 B1 | 7/2002 | Hoffberg et al. | |
| 6,421,700 B1 | 7/2002 | Holmes et al. | |
| 6,427,142 B1 | 7/2002 | Zachary et al. | |
| 6,430,531 B1 | 8/2002 | Polish | |
| 6,438,618 B1 | 8/2002 | Lortz et al. | |
| 6,442,549 B1 | 8/2002 | Schneider | |
| 6,442,589 B1 | 8/2002 | Takahashi et al. | |
| 6,442,620 B1 | 8/2002 | Thatte et al. | |
| 6,446,076 B1 | 9/2002 | Burkey et al. | |
| 6,446,109 B2 | 9/2002 | Gupta | |
| 6,460,036 B1 * | 10/2002 | Herz | 1/1 |
| 6,462,759 B1 | 10/2002 | Kurtzberg et al. | |
| 6,466,232 B1 | 10/2002 | Newell et al. | |
| 6,477,117 B1 | 11/2002 | Narayanaswami et al. | |
| 6,483,485 B1 | 11/2002 | Huang et al. | |
| 6,484,200 B1 | 11/2002 | Angal et al. | |
| 6,487,552 B1 * | 11/2002 | Lei et al. | 707/4 |
| 6,490,579 B1 * | 12/2002 | Gao et al. | 707/4 |
| 6,505,196 B2 | 1/2003 | Drucker et al. | |
| 6,507,567 B1 | 1/2003 | Willars | |
| 6,507,845 B1 | 1/2003 | Cohen et al. | |
| 6,513,046 B1 | 1/2003 | Abbott, III et al. | 707/104.1 |
| 6,519,552 B1 | 2/2003 | Sampath et al. | |
| 6,526,035 B1 | 2/2003 | Atarius et al. | |
| 6,529,723 B1 | 3/2003 | Bentley | |
| 6,539,336 B1 * | 3/2003 | Vock et al. | 702/182 |
| 6,542,889 B1 | 4/2003 | Aggarwal et al. | |
| 6,546,425 B1 | 4/2003 | Hanson et al. | |
| 6,546,554 B1 | 4/2003 | Schmidt et al. | |
| 6,549,915 B2 | 4/2003 | Abbott, III et al. | 707/104.1 |
| 6,549,944 B1 * | 4/2003 | Weinberg et al. | 709/224 |
| 6,553,336 B1 | 4/2003 | Johnson et al. | |
| 6,563,430 B1 | 5/2003 | Kemink et al. | |
| 6,568,595 B1 * | 5/2003 | Russell et al. | 235/462.01 |
| 6,571,279 B1 | 5/2003 | Herz et al. | 709/217 |
| 6,578,019 B1 | 6/2003 | Suda et al. | |
| 6,625,135 B1 | 9/2003 | Johnson et al. | |
| 6,636,831 B1 | 10/2003 | Profit, Jr. et al. | |
| 6,643,684 B1 * | 11/2003 | Malkin et al. | 709/206 |
| 6,652,283 B1 | 11/2003 | Van Schaack et al. | |
| 6,661,437 B1 | 12/2003 | Miller et al. | |
| 6,672,506 B2 | 1/2004 | Swartz et al. | |
| 6,697,836 B2 | 2/2004 | Kawano et al. | |
| 6,704,722 B2 | 3/2004 | Wang Baldonado | |
| 6,704,785 B1 | 3/2004 | Koo et al. | |
| 6,704,812 B2 | 3/2004 | Bakke et al. | |
| 6,707,476 B1 | 3/2004 | Hochstedler | |
| 6,712,615 B2 | 3/2004 | Martin | |
| 6,714,977 B1 | 3/2004 | Fowler et al. | |
| 6,738,040 B2 | 5/2004 | Jahn et al. | |
| 6,738,759 B1 | 5/2004 | Wheeler et al. | |
| 6,741,188 B1 | 5/2004 | Miller et al. | |
| 6,741,610 B1 | 5/2004 | Volftsun et al. | |
| 6,747,675 B1 | 6/2004 | Abbott et al. | |
| 6,751,620 B2 | 6/2004 | Orbanes et al. | |
| 6,766,245 B2 | 7/2004 | Padmanabhan | |
| D494,584 S | 8/2004 | Schlieffers et al. | |
| 6,791,580 B1 | 9/2004 | Abbott et al. | |
| 6,795,806 B1 | 9/2004 | Lewis et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,829,639 B1 | 12/2004 | Lawson et al. | |
| 6,834,195 B2 | 12/2004 | Brandenberg et al. | |
| 6,834,208 B2 | 12/2004 | Gonzales et al. | |
| 6,837,436 B2 | 1/2005 | Swartz et al. | |
| 6,842,877 B2 * | 1/2005 | Robarts et al. | 715/708 |
| 6,853,966 B2 | 2/2005 | Bushey et al. | |
| 6,868,525 B1 | 3/2005 | Szabo | |
| 6,874,017 B1 | 3/2005 | Inoue et al. | |
| 6,874,127 B2 | 3/2005 | Newell et al. | |
| 6,885,734 B1 | 4/2005 | Eberle et al. | |
| 6,963,899 B1 | 11/2005 | Fernandez et al. | |
| 6,968,333 B2 | 11/2005 | Abbott et al. | |
| 7,000,187 B2 | 2/2006 | Messinger et al. | |
| 7,010,501 B1 | 3/2006 | Roslak et al. | |
| 7,010,603 B2 | 3/2006 | Martin, Jr. et al. | |
| 7,040,541 B2 | 5/2006 | Swartz et al. | |
| 7,046,263 B1 | 5/2006 | Abbott et al. | |
| 7,055,101 B2 | 5/2006 | Abbott et al. | |
| 7,058,893 B2 | 6/2006 | Abbott et al. | |
| 7,058,894 B2 | 6/2006 | Abbott et al. | |
| 7,062,715 B2 | 6/2006 | Abbott et al. | |
| 7,063,263 B2 | 6/2006 | Swartz et al. | |
| 7,076,737 B2 | 7/2006 | Abbott et al. | |
| 7,080,322 B2 | 7/2006 | Abbott et al. | |
| 7,089,497 B2 | 8/2006 | Abbott et al. | |
| 7,096,253 B2 * | 8/2006 | Vinson et al. | 709/203 |
| 7,103,806 B1 * | 9/2006 | Horvitz | 714/43 |
| 7,107,539 B2 | 9/2006 | Abbott et al. | |
| 7,110,764 B1 | 9/2006 | Blair et al. | |
| 7,120,558 B2 * | 10/2006 | McIntyre et al. | 702/183 |
| 7,124,125 B2 | 10/2006 | Cook et al. | |
| 7,137,069 B2 | 11/2006 | Abbott et al. | |
| 7,155,456 B2 | 12/2006 | Abbott, III et al. | |
| 7,162,473 B2 | 1/2007 | Dumais et al. | |
| 7,171,378 B2 | 1/2007 | Petrovich et al. | |
| 7,195,157 B2 | 3/2007 | Swartz et al. | |
| 7,203,906 B2 | 4/2007 | Abbott et al. | |
| 7,225,229 B1 | 5/2007 | Abbott et al. | |
| 7,231,439 B1 | 6/2007 | Abbott et al. | |
| 7,260,453 B2 | 8/2007 | Poier et al. | |
| 7,349,894 B2 | 3/2008 | Barth et al. | |
| 7,360,152 B2 | 4/2008 | Capps et al. | |
| 7,385,501 B2 | 6/2008 | Miller et al. | |
| 7,386,477 B2 | 6/2008 | Fano | |
| 7,392,486 B1 | 6/2008 | Gyde et al. | |
| 7,395,221 B2 | 7/2008 | Doss et al. | |
| 7,444,594 B2 | 10/2008 | Abbott et al. | |
| 7,464,153 B1 | 12/2008 | Abbott et al. | |
| 7,512,889 B2 | 3/2009 | Newell et al. | |
| 7,533,052 B2 | 5/2009 | Tilfors et al. | |
| 7,533,082 B2 | 5/2009 | Abbott et al. | |
| 7,561,200 B2 | 7/2009 | Garvey, III et al. | |

| | | |
|---|---|---|
| 7,571,218 B2 | 8/2009 | Tanaka et al. |
| 7,614,001 B2 | 11/2009 | Abbott et al. |
| 7,647,400 B2 | 1/2010 | Abbott et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. ....... 707/104.1 |
| 2002/0044152 A1 | 4/2002 | Abbott et al. |
| 2002/0052930 A1 | 5/2002 | Abbott et al. |
| 2002/0052963 A1 | 5/2002 | Abbott et al. |
| 2002/0054130 A1 | 5/2002 | Abbott et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1* | 6/2002 | Robarts et al. ................ 706/12 |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0147880 A1 | 10/2002 | Wang Baldonado |
| 2002/0191034 A1 | 12/2002 | Sowizral et al. |
| 2003/0046401 A1 | 3/2003 | Abbott et al. |
| 2003/0154476 A1 | 8/2003 | Abbott, III et al. ............ 725/37 |
| 2003/0186201 A1 | 10/2003 | Martin |
| 2003/0229900 A1* | 12/2003 | Reisman ..................... 725/87 |
| 2004/0088328 A1 | 5/2004 | Cook et al. |
| 2004/0133600 A1 | 7/2004 | Homer |
| 2004/0186854 A1 | 9/2004 | Choi |
| 2004/0201500 A1 | 10/2004 | Miller et al. |
| 2004/0215663 A1 | 10/2004 | Liu et al. |
| 2004/0267700 A1* | 12/2004 | Dumais et al. ................. 707/2 |
| 2004/0267812 A1 | 12/2004 | Harris et al. |
| 2005/0027704 A1* | 2/2005 | Hammond et al. ............. 707/5 |
| 2005/0034078 A1 | 2/2005 | Abbott et al. |
| 2005/0066282 A1 | 3/2005 | Abbott et al. |
| 2005/0160113 A1 | 7/2005 | Sipusic et al. |
| 2005/0165843 A1 | 7/2005 | Capps et al. |
| 2005/0193017 A1 | 9/2005 | Kim |
| 2005/0266858 A1 | 12/2005 | Miller et al. |
| 2005/0272442 A1 | 12/2005 | Miller et al. |
| 2006/0004680 A1 | 1/2006 | Robarts et al. |
| 2006/0019676 A1 | 1/2006 | Miller et al. |
| 2006/0136393 A1 | 6/2006 | Abbott et al. |
| 2006/0259494 A1* | 11/2006 | Watson et al. ................. 707/10 |
| 2007/0022384 A1 | 1/2007 | Abbott et al. |
| 2007/0043459 A1 | 2/2007 | Abbott et al. |
| 2007/0089067 A1 | 4/2007 | Abbott et al. |
| 2007/0130524 A1 | 6/2007 | Abbott et al. |
| 2007/0168502 A1 | 7/2007 | Abbott et al. |
| 2007/0185864 A1* | 8/2007 | Budzik et al. .................. 707/5 |
| 2007/0266318 A1 | 11/2007 | Abbott et al. |
| 2008/0090591 A1 | 4/2008 | Miller et al. |
| 2008/0091537 A1 | 4/2008 | Miller et al. |
| 2008/0147775 A1 | 6/2008 | Abbott et al. |
| 2008/0161018 A1 | 7/2008 | Miller et al. |
| 2008/0313271 A1 | 12/2008 | Abbott et al. |
| 2009/0013052 A1 | 1/2009 | Robarts et al. |
| 2009/0055752 A1 | 2/2009 | Abbott et al. |
| 2009/0094524 A1 | 4/2009 | Abbott et al. |
| 2009/0150535 A1 | 6/2009 | Abbott et al. |
| 2009/0228552 A1 | 9/2009 | Abbott et al. |
| 2009/0234878 A1* | 9/2009 | Herz et al. .................. 707/102 |

FOREIGN PATENT DOCUMENTS

| | | |
|---|---|---|
| EP | 0759591 A1 | 2/1997 |
| EP | 0801342 A2 | 10/1997 |
| EP | 0846440 A2 | 6/1998 |
| EP | 0924615 A2 | 6/1999 |
| JP | 05-260188 | 10/1993 |
| JP | 11306002 A | 11/1999 |
| WO | WO 90/08361 | 7/1990 |
| WO | WO-9531773 A1 | 11/1995 |
| WO | WO 97/03434 | 1/1997 |
| WO | WO-9734388 A2 | 9/1997 |
| WO | WO-9800787 A1 | 1/1998 |
| WO | WO 98/47084 | 10/1998 |
| WO | WO 99/17228 | 4/1999 |
| WO | WO-9926180 A1 | 5/1999 |
| WO | WO-9966394 A1 | 12/1999 |
| WO | WO-9967698 A2 | 12/1999 |
| WO | WO-0036493 A1 | 6/2000 |

OTHER PUBLICATIONS

Cochran, Shannon, "The Development of Wearable Computing", Dr. Dobb's, online edition, pp. 1-2.*
Budzik et al., "Watson: Anticipating and Contextualizing Information Needs", May 1, 1999, In Proceedings of the Sixty-second Annual Meeting of the American Society for Information Science, pp. 1-14.*
Goharian et al., "Enterprise Text Processing: A Sparse Matrix Approach", 2001, IEEE, pp. 71-75.*
International Search Report, PCT/US01/10538, Aug. 14, 2002, 3 pages.
National Instruments, "BridgeVIEW and LabVIEW G Programming Reference Manual," Jan. 1998.
National Instruments, "LabVIEW User Manual,", Jan. 1998.
"'Affective Understanding:' Modeling and Responding to User Affect," retrieved Oct. 2, 1998, from http://www.media.mit.edu/affect/AC_research/understanding.html, pp. 1-3.
"Alps GlidePoint," retrieved Oct. 2, 1998, from http://www.alps.com/p17.html, 1 page.
"GyroPoint Technology," retrieved Oct. 2, 1998, from http://www.gyration.com/html/gyropoint.html, pp. 1-3.
"Haptics," retrieved Oct. 2, 1998, from http://www.ai.mit.edu/projects/handarm-haptics/haptics.html, pp. 1-2.
"Research Areas in Affective Computing," retrieved Oct. 2, 1998, from http://www.media.mit.edu/affect/, 1 page.
"Research on Affective Pattern Recognition and Modeling," retrieved Oct. 2, 1998, from http://www.media.mit.edu/affect/AC_research/recognizing.html, pp. 1-4.
"Research on Sensing Human Affect," retrieved Oct. 2, 1998, from http://www.media.mit.edu/affect/AC_research/sensing.html, pp. 1-5.
"Smart Rooms," retrieved Oct. 2, 1998, from http://vismod.www.media.mit.edu/vismod/demos/smartroom/, pp. 1-3.
"SmartDesk Home Page," retrieved Oct. 2, 1988, from http://vismod.www.media.mit.edu/vismod/demos/smartdesk/, pp. 1-4.
"The MIT Wearable Computing Web Page," retrieved Oct. 2, 1998, from http://wearables.www.media.mit.edu/projects/wearables/, pp. 1-3.
"Wearable Computer Systems for Affective Computing," retrieved Oct. 2, 1998, from http://www.media.mit.edu/affect/AC_research/wearables.html, pp. 1-5.
Aoki, H., et al., "Realtime Personal Positioning System for a Wearable Computer," *3rd International Symposium on Wearable Computers*, San Francisco, CA, Oct. 18-19, 1999.
Amon et al., "Integration of Design Education, Research and Practice at Carnegie Mellon University: A Multi-Disciplinary Course in Wearable Computer Design," *In Proceedings of the Frontiers in Education Conference*, Nov. 1995, pp. 4a1, 14a1, vol. 2.
Bauer et al., "A Collaborative Wearable System with Remote Sensing," University of Oregon, Feb. 1996.
Billinghurst, M., et al., "New Ways to Manage Information," *IEEE*, pp. 57-64, Jan. 1999.
Bowskill, J., et al., "Wearable Location Mediated Telecommunications; A First Step Towards Contextual Communication," *3rd International Symposium on Wearable Computers*, San Francisco, CA, Oct. 18-19, 1999.
Dey, A., et al., "The Conference Assistant: Combining Context-Awareness with Wearable Computing," *3rd International Symposium on Wearable Computers*, San Francisco, CA, Oct. 18-19, 1999.
Fickas, S., et al., "Software Organization for Dynamic and Adaptable Wearable Systems," 1997, 8 pages.

Finger et al., "Rapid Design and Manufacture of Wearable Computers," Communication of the ACM, vol. 39, No. 2, Feb. 1996, pp. 63-68.

Gabbard, J., et al., "A Taxonomy of Usability Characteristics in Virtual Environments," Nov. 1997, retrieved from http://csgrad.cs.vt.edu/~jgabbard/ve/taxonomy/.

Gavrilova, T., et al., "An Approach to Mapping of User Model to Corresponding Interface Parameters," 1997, pp. 24-29, retrieved from http://citiseer.nj.nec.com/context/109679/352175>.

Golding, A., et al., "Indoor Navigation Using A Diverse Set of Cheap, Wearable Sensors," 3$^{rd}$ International Symposium on Wearable Computers, San Francisco, CA, Oct. 18-19, 1999.

Hull et al., "Towards Situated Computing," Hewlett-Packard Laboratories, HPL-97-66 (1997).

Kirsch, D., "The Sentic Mouse: A Tool for Measuring Emotional Valence," retrieved Oct. 2, 1998, from http://www.media.mit.edu/affect/AC_research/projects/sentic_mouse.html, pp. 1-2.

Kortuem et al., "Context-Aware, Adaptive Wearable Computers as Remote Interfaces to 'Intelligent' Environments," University of Oregon, Oct. 1998.

Kortuem, G., "When Cyborgs Meet: Building Communities of Cooperating Wearable Agents," 3$^{rd}$ International Symposium on Wearable Computers, San Francisco, CA, Oct. 18-19, 1999.

Lashkari, Y., et al., "Collaborative Interface Agents," Proceedings of AAAI '94 Conference, Seattle, WA, Aug. 1994.

Lehikoinen, J., et al., "MEX: A Distributed Software Architecture for Wearable Computers," 3$^{rd}$ International Symposium on Wearable Computers, San Francisco, CA, Oct. 18-19, 1999.

Leonhardi, A., et al., "Virtual Information Towers—A Metaphor for Intuitive, Location-Aware Information Access in a Mobile Environment," 3$^{rd}$ International Symposium on Wearable Computers, San Francisco, CA, Oct. 18-19, 1999.

Lunt, T., et al., "Knowledge-Based Intrusion Detection," Proceedings of the Annual Artificial Intelligence Systems in Government Conference, IEEE Comp. Soc. Press, vol. Conf. 4, 1989, pp. 102-107.

Maes, P., "Agents that Reduce Work and Information Overload," Communications of the ACM 37(7), Jul. 1994.

Mann, S., "'Smart Clothing': Wearable Multimedia Computing and 'Personal Imaging' to Restore the Technological Balance Between People and Their Environments," ACM Multimedia, pp. 163-174, Nov. 1996.

Metz, C., "MIT: Wearable PC's, Electronic Ink, and Smart Rooms," PC Magazine, pp. 192-193, Jun. 1998.

Oakes, C., "The Truman Show Realized?, " retrieved Oct. 21, 1998, from http://www.wired.com/news/news/technology/story/15745.html, pp. 1-4.

Ockerman et al., "Wearable Computer For Performance Support; Initial Feasibility Study," International Symposium in Wearable Computers, Oct. 1997, pp. 10-17.

Picard, R., et al., "Affective Wearables," Personal Technologies vol. 1:231-240, MIT Media Laboratory, 1997.

Rekimoto et al., "The World Through the Computer: Computer Augmented Interaction with Real World Environments," ACM, Nov. 1995, pp. 29-36.

Rhodes, B., "WIMP Interface Considered Fatal," retrieved Oct. 2, 1998, from http://rhodes.www.media.mit.edu./people/rhodes/Papers/no-wimp.html, pp. 1-3.

Rhodes, B., "The Wearable Remembrance Agent: A System for Augmented Memory," Proceedings of the First International Symposium on Wearable Computers (ISWC '97), Cambridge, MA, Oct. 13-14, 1997.

Rogers, E., et al., "Outbreak Agent: Intelligent Wearable Technology for Hazardous Environments," 1997 IEEE International Conference, Orlando Florida, Oct. 12-15, 1997, pp. 3198-3203.

Sato, J., et al., "Autonomous Behavior Control of Virtual Actors Based on the AIR Model," Proceedings Computer Animation, Jun. 5, 1997.

Schneider, J., et al., "Modeling Wearable Negotiation in an Opportunistic Task Oriented Domain," 3$^{rd}$ International Symposium on Wearable Computers, San Francisco, CA, Oct. 18-19, 1999.

Smailagic et al., "Matching Interface Design with User Task: Modalities of Interaction with CMU Wearable Computers," IEEE Personal Communications, Feb. 1996, pp. 14-25.

Smailagic, A., et al., "MoCCA: A Mobile Communication and Computing Architecture," 3$^{rd}$ International Symposium on Wearable Computers, San Francisco, CA, Oct. 18-19, 1999.

Starner et al., "Visual Contextual Awareness in Wearable Computing," Media Lab, MIT, Oct. 1998.

Tan, H., et al., "Tactual Displays for Wearable Computing," IEEE, Massachusetts Institute of Technology Media Laboratory, pp. 84-88, 1997.

Yang, J., et al., "Smart Sight: A Tourist Assistant System," 3$^{rd}$ International Symposium on Wearable Computers, San Francisco, CA, Oct. 18-19, 1999.

[No Author Listed] "Context Recognition by User Situation Data Analysis (Context)". Http://www.cs.helsinki.fi/group/context/. Last accessed Dec. 9, 2008, 7 pages.

[No Author Listed] "Context-Awareness in Wearable and Ubiquitous Computing." Future Computing Environments, 1997. GVU Technical Report GIT-GVU-97-11.

[No Author Listed] "Intelligent User Interface Prompt level,"IBM Technical Decision Bulletin, IBM Corp, New Yor,vol. 35, No. 1A, Jun. 1992, pp. 25-26.

[No Author Listed] "Workshop on Wearable Computing Systems," Aug. 19-21, 1996.

Bacon, et al. "Using Events to Build Distributed Applications," University of Cambridge, 1996. http://citeseerx.ist.psu.edu/viewdoc/summary?doi=10.1.1.34.4545. Last accessed Dec. 9, 2008, 8 pages.

Bates et al., Middleware Support for Mobile Multimedia Applications, ICL System Journal, Nov. 1997, 20 pages.

Bier, et al. "Toolglass and Magic Lenses: The See-Through Interface," Proceedings of SIGGRAPH'93, Computer Graphics and Annual Conference Series, ACM, pp. 73-80, Anaheim, California, 1993. http://citeseerx.ist.psu.edu/viewdoc/summary?doi=10.1.1.36.9741. Last accessed Dec. 9, 2008, 8 pages.

Billinghurst, et al., An Evaluation of Wearable Information Spaces, Proceedings of the Virtual Reality Annual International Symposium, 1998, 8 pages.

Billinghurst. Research Directions in Wearable Computing, University of Washington, May, 1998, 48 pages.

Biskup, et al, "Towards Secure Mediation", Oct. 1989.

Brown et al., "Using Explicit Requirements and Metrics for Interface Agent User Model Correction," Autonomous Agents '98.

Brown, et al. "Utility Theory-Based User Models for Intelligent Interface Agents," Proceedings of the Twelth Canadian Conference on Artificial Intelligence (AI'98), Jun. 1998.

Chen, et al., A Survey of Context-Aware Mobile Computing Research, Dartmouth Computer Science Technical Report, 2000, 16 pages.

Crabtree, et al. "Wearable Computing and the Remembrance Agent," BT Technology Journal, vol. 16, No. 3, Jul. 1998, pp. 118-124. http://citeseerx.ist.psu.edu/viewdoc/summary?doi=10.1.1.31.8514. Last accessed Dec. 9, 2008, 7 pages.

Cugola et al., Exploiting an Event-Based Infrastructure to Develop Complex Distributed Systems, 20th International Conference on Software Engineering (ICSE'98) Apr. 1998, p. 261-70, 10 pages.

D'Orazio, et al. Mobile Robot Position Determination Using Visual Landmarks. IEEE Transactions on Industrial Electronics, vol. 41, issue 6, Dec. 1994, pp. 654-662. Last accessed 112/9/08, 9 pages.

Dechamboux et al., Using a Distributed Shared Memory for Implementing Efficient Information Mediators, Proceedings of the International Conference and Exhibition on High-Performance Computing and Networking, Apr. 1996, 5 pages.

Dey et al., CyberDesk: A Framework for Providing Self-Integrating Context-Aware Services, Knowledge-Based Systems, 11:3-13, 1998, 10 pages.

Doorenbos, et al. "A Scalable Comparison-Shoping Agent for the World-Wide-Web," Proceedings of the First International Conference on Autonomous Agents, Marina Del Rey, California, Feb. 5-8, 1997 pp. 39-48. http://www.cs.washington.edu/homes/etzioni/papers/agents97.pdf. Last accessed Dec. 9, 2008, 10 pages.

European Office Action dated Feb. 13, 2009 for EP Application No. 01964695.9, 4 pages.

Goh et al., "Content Interchange: New Features and Formalisms for the Intelligent Integration of Information." ACM transactions on

*Information Systems*, 1997. http://dspace.mit.edu/bitstream/handle/1721.1/2642/SWP-3941-36987967.pdf?sequence=1. Last accessed Dec. 10, 2008. 25 pages.

Goodridge, "The Environment Understanding Interfae: Decting and Tracking Human Activity Through Multimedia Sensors." 1995.

Han, et al., "DBMiner: A System for Mining Knowledge in Large Relational Database,"Proceedings 1996 International Conference on Data Mining and Knowledge Discovery, Portland, OR, Aug. 1996. http://www.cs.ualberta.ca/zaiane/postscript/kdd96.pdf. Last accessed Dec. 9, 2008, 6 pages.

Harter, et al. "A Distributed Location System for the Active Office", IEEE Network, 1994 pp. 62-70.

Horvitz et al., Attention-Sensitive Alerting in Computing Systems, Microsoft Research, Aug. 1999.

Horvitz et al., In Pursuit of Effective Handsfree Decision Support: Coupling Bayesian Interference, Speech Understanding, and Understanding, and User Models, 1995, 8 pages.

International Search Report dated Sep. 29, 2003 for PCT Application Serial No. 00/20685, 3 pages.

International Search Report for PCT Application No. PCT/US01/10394, Mailed Jun. 13, 2002, 5 pages.

International Search Report PCT/US01/32543, Oct. 27, 2003, 3 pages.

International Search Report, Application No. PCT/US01/10599, Nov. 28, 2002.

Jakobovits, "Integrating Autonomous Heterogeneous Information Sources." University of Washington, Technical Report UV-CSE-971205, Jul. 15, 1997, 29 pages.

Joachims, T., Text categorization with support vector machines: learning with many relevant features, Machine Learning, European Conference on Machine Learning, Apr. 21, 1998 pp. 137-142.

Leonhardt et al., Multi-Sensor Location Tracking, Department of Computing, London UK Oct. 1998.

Losee, Jr., Miniminizing Information Overload: the ranking of electronic messages, Journal of Information Science 15, Elsevier Science Publishers B.V. 1989, pp. 179-189.

Mott, et al., A Formalism for Context Mediation based on Feature Logi, Feb. 1998. http://citeseerx.ist.psu.edu/viewdoc/summary?doi=10.1.1.52.4473. Last accessed Dec. 10, 2008, 11 pages.

Ni. Attribute Name Evaluation and its Implementation, School of Computing and methematics, Deakin University, Geelong, Victoria, May 16, 1994. http://www.deakin.edu.au/scitech/sit/dsapp/archive/techreport/TR-C94-10.pdf. Last accessed Dec. 9, 2008, 32 pages.

OA Dated Aug. 1, 2008 for U.S. Appl. No. 11/179,822.

OA Dated Nov. 28, 2008 for U.S. Appl. No. 11/761,210, 11 pages.

OA Dated Dec. 3, 2008 for U.S. Appl. No. 09/981,320, 40 pages.

OA Dated Jul. 28, 2008 for U.S. Appl. No. 10/984,511, 28 pages.

OA Dated Sep. 17, 2008 for U.S. Appl. No. 09/894,642, 28 pages.

OA Dated Aug. 14, 2008 for U.S. Appl. No. 10/981,941, 14 pages.

OA dated Dec. 4, 2008 for U.S. Appl. No. 11/567,902.

OA dated Jan. 2, 2009 for U.S. Appl. No. 11/559,854, 23 pages.

OA Dated Oct. 30, 2008 for U.S. Appl. No. 11/490,540, 37 pages.

OA Dated Sep. 15, 2008 for U.S. Appl. No. 11/033,974, 17 pages.

Ockerbloom, Mediating Among Diverse Data Formats: Thesis Summary, PhD Thesis, Technical Report CMU-CS-98-102, Department of Computer Sciences, Carnegie Mellon University, Pittsburgh, PA, Jan. 14, 1998, 15 pages.

Papakonstantinou et al., "MedMaker: A Mediatation System Based on Declarative Specification." 1995 http://citeseerx.ist.psu.edu/viewsoc/summary?di=10.1.1.35.735. Last accessed Nov. 25, 2008, 10 pages.

Pascoe, Adding Generic Contextual Capabilities to Wearable Computers, Proceedings of the 2nd International Symposium on Wearable Computers (ISWC '98), Pittsburgh, PA, Oct. 19-20, 1998, 8 pages.

Rhodes, Remembrance Agent: A continuously running automated information retrieval system, The Proceedings of the First International Conference on the Practical Application of Intelligent Agents and Multi Agent Technology, 1996, pp. 487-495.

Rhodes, The Wearable Remembrance Agent: A System for Augmented Memory. Personal Technologies Journal Special Issue on Wearable Computing, 1997, 12 pages.

Rosis, et al. "Adaptive Interaction with Knowledge-Based System," ACM 1994.

Sawhney, Contextual awareness, messaging and communication in nomadic audio environments, Massachusetts Institute of Technology, Jun. 1998 pp. 80-105, 25 pages.

Schilit et al, Disseminating Active Map Information to Mbile Hosts, IEEE Network, 1994, pp. 22-32, vol. 8-No. 5.

Schilit et al., Context-Aware Computing Applications, In Proceedings of the Workshop on Mobile Computing Systems and Applications, Dec. 1994, pp. 85-90.

Schilit et al., Customizing Mobile Applications, Proceedings USENIX Symposiumon Mobile and Location Independent Computing, Aug. 1993, 9 pages.

Schilit, et al. The ParcTab Mobile Computer System, IEEE WWOS-IV, 1993, 4 pages.

Schilt. A System Architecture for Context-Aware Mobile Computer, Columbia University, 1995, 153 pages.

Schmidt et al., "There's More to Context Than Location: Environment Sensing Technologies for Adaptive Mobile User Interfaces." Nov. 1998.

Spreitzer et al., "Providing Location Information in a Ubiquitous Computing Environment," Xeriox Palo Alto Research Center, ACM, 1993, pp. 270-283. http://www.computing/staff/kc/Lecturing/MSc/wk10/p270-spreitzer.pdf. Last access Dec. 9, 2008, 14 pages.

Spreitzer et al., Architectural Considerations for Scalable, Secure, Mobile Computing with Location Information, In The 14th International Conference on Distributed Computing Systems, Jun. 1994, pp. 29-38.

Spreitzer et al., Scalable, Secure, Mobile Computingh with Location Information Communications of the ACM, Jul. 1993, 1 page, vol. 36-No. 7.

Starner, Wearable Computing and Contextual Awareness, Massachusetts Institute of Technology, Jun. 1999, 248 pages.

Starovic, An Event Based Object Model for Distributed Programming, Technical Report TCD-CS-95-28, Dept. of Computer Science, Trinity College Dublin, Ireland, 1995, retrieved from http://citeseer.ist.psu.edu/starovic95event.html, 15 pages.

Theimer et al., Operating System Issue for PDAs, in Fourt Workshop on Workstation Operating Systems, 1993, 7 pages.

Wachowicz et al., "Combining Location and Data Management in an Environment for Total Mobility." University of Cambridge, England 1996.

Want, Active Badges and Personal Interactive Computing Objects, IEEE Transactions on Consumer Electronics, 1992, 11 pages, vol. 38- No. 1.

Want, et al., The Active Badge Location System, ACM Transactions on Information Systems, Jan. 1992, pp. 91-102, vol. 10-No. 1.

Wardell, "Stardock.net Releases WindowBlinds." Stardock.net, Inc. Oct. 4, 1999. http://stardock.net/media/pr_wb10.html. Last accessed Dec. 9, 2008, 2 pages.

Weiser, Some Computer Science Issues in Ubiquitous Computing, Communications of the ACM, Jul. 1993, pp. 75-84, vol. 36-No. 7.

Weiser, The Computer for the 21st Century, Scientific American, Sep. 1991, 8 pages.

Zenel, et al. "A General Purpose Proxy Filtering Mechanism Applied to the Mobile Environment," Proceedings of the 3rd Annual ACM/IEEE Internatioanl conference on Mobile comptuing and networking, MOBICOM'97. Budapest, Hungary, pp. 248-259. http://portal.acm.org/citation.cfm?id=262153. Last accessed Dec. 9, 2008, 12 pages.

Salber et al., The Design and Use of a Generic Context Server. Technical Report GIT-GVU-98-32. GVU Center, College of Computing, Georgia Institute of Technology. 1998. Available at ftp://ftp.cc.gatech.edu/pub/gvu/tr/1998/98-32.pdf. Last accessed Mar. 12, 2010.

\* cited by examiner attribute instance table 400

| attribute name | context server name | value | uncertainty | timestamp | units | number of context clients consuming |
|---|---|---|---|---|---|---|
| user.location | gps | 47°38.73' N, 122°18.43' W | 0°.09' | 13:11:04.023 2/22/2000 | degrees/minutes | 2 |
| user.location | ips | 47°38.745' N, 122°18.424' W | 0°.021' | 13:11:01.118 2/22/2000 | degrees/minutes | 2 |
| user.elevation | ips | 22 | .5 | 13:11:01.118 2/22/2000 | meters | 1 |
| user.in_region | location_region_ analysis | none | .05% | none | none | 0 |

401 / 402 / 403 / 404 — 411 / 412 / 413 / 414 / 415 / 416 / 417

*Fig. 4* logging configuration table 500

| log name | attribute name | context server name | logging frequency | maximum attribute value age | importance level | pre-logging processing | maintenance processing | last logged |
|---|---|---|---|---|---|---|---|---|
| user_log | user.location | gps | 00:02:00.000 | 00:00:00.000 | 8 | none | none | 14:05:10.011 2/22/2000 |
| user_log | user.in_region | location_region_ analysis | 00:10:00.000 | 00:02:30.000 | 6 | omit logging where value matches last-logged | summarize weekly | 14:04:36.121 2/22/2000 |

*Fig. 5* attribute log table -- user_log 700

| attribute name | context server | value | uncertainty | timestamp | units | format version | flags | logged time |
|---|---|---|---|---|---|---|---|---|
| user.location | gps | 47°38.73' N, 122°18.43' W | 0° .09' | 14:01:09.724 2/22/2000 | degrees/minutes | 1.01 | none | 14:01:09.727 2/22/2000 |
| user.location | gps | 47°38.745' N, 122°18.22' W | 0° .09' | 14:03:09.873 2/22/2000 | degrees/minutes | 1.01 | none | 14:03:09.877 2/22/2000 |
| user.in_region | location_region_ analysis | TRUE | .05% | 14:04:30.408 2/22/2000 | none | 1.01 | none | 14:04:36.121 2/22/2000 |
| user.location | gps | 47°38.745' N, 122°18.22' W | 0° .10' | 14:05:10.008 2/22/2000 | degrees/minutes | 1.01 | none | 14:05:10.011 2/22/2000 |

*Fig. 7*

LOGGING AND ANALYZING CONTEXT ATTRIBUTES

CROSS-REFERENCE TO RELATED APPLICATIONS

This application is a continuation of U.S. patent application Ser. No. 09/541,326. U.S. patent application Ser. No. 09/541,326 is a continuation-in-part of U.S. patent application Ser. No. 09/216,193, entitled "Method And System For Controlling Presentation Of Information To A User Based On The User's Condition" and filed Dec. 18, 1998, and a continuation-in-part of U.S. patent application Ser. No. 09/464,659, entitled "Storing And Recalling Information To Augment Human Memories" and filed Dec. 15, 1999. Each of these three applications is hereby incorporated by reference in its entirety.

TECHNICAL FIELD

The present invention is directed to the field of data storage and analysis, and, more particularly, to the field of storage and analysis of user context data, such as in a wearable personal computer.

BACKGROUND

Most general-purpose computer systems are designed to operate by processing commands as they are inputted. As a result, the only information such a computer system typically possesses about the condition of its user is the commands issued by the user. In particular, such a computer system generally only possesses this very limited type of information about the user's condition for the short time during which the computer system is processing the command.

A few special-purpose application programs that execute on general-purpose computer systems maintain a record of the commands issued by the user. For example, the Microsoft Internet Explorer and Netscape Navigator web browser applications accept commands to display particular web pages, and have a "history" feature that maintains and displays a list of web page requests made by the user. The history feature enables the user to review his or her web page requests, and to resubmit a web page request by selecting it from the list.

While such application history features can be useful, they are not extensively configurable, with respect to either the identity of the information that they record, the manner in which they record it, the manner in which they maintain it once recorded, or the nature of any later-performed analysis on the recorded information. Further, such history features are inherently limited to recording information in the possession of their host applications, and thus do not record other information such as the state of other applications, the operating system, or the computer system hardware. Such history features also fail to record information about the user, or about the environment surrounding the computer system and/or the user.

Accordingly, a facility in a general-purpose computer system for selectively recording, maintaining, and analyzing information about the computer system, a user, and/or their environment would have significant utility.

BRIEF DESCRIPTION OF THE DRAWINGS

FIG. 4 is a data structure diagram showing an attribute instance table in which the characterization module caches attribute instance values.

FIG. 5 is a data structure diagram showing a logging configuration table used by the facility to determine which attribute instances to log and when.

FIG. 7 is a data structure diagram showing an attribute log table produced by the facility.

DETAILED DESCRIPTION

Figure 1:
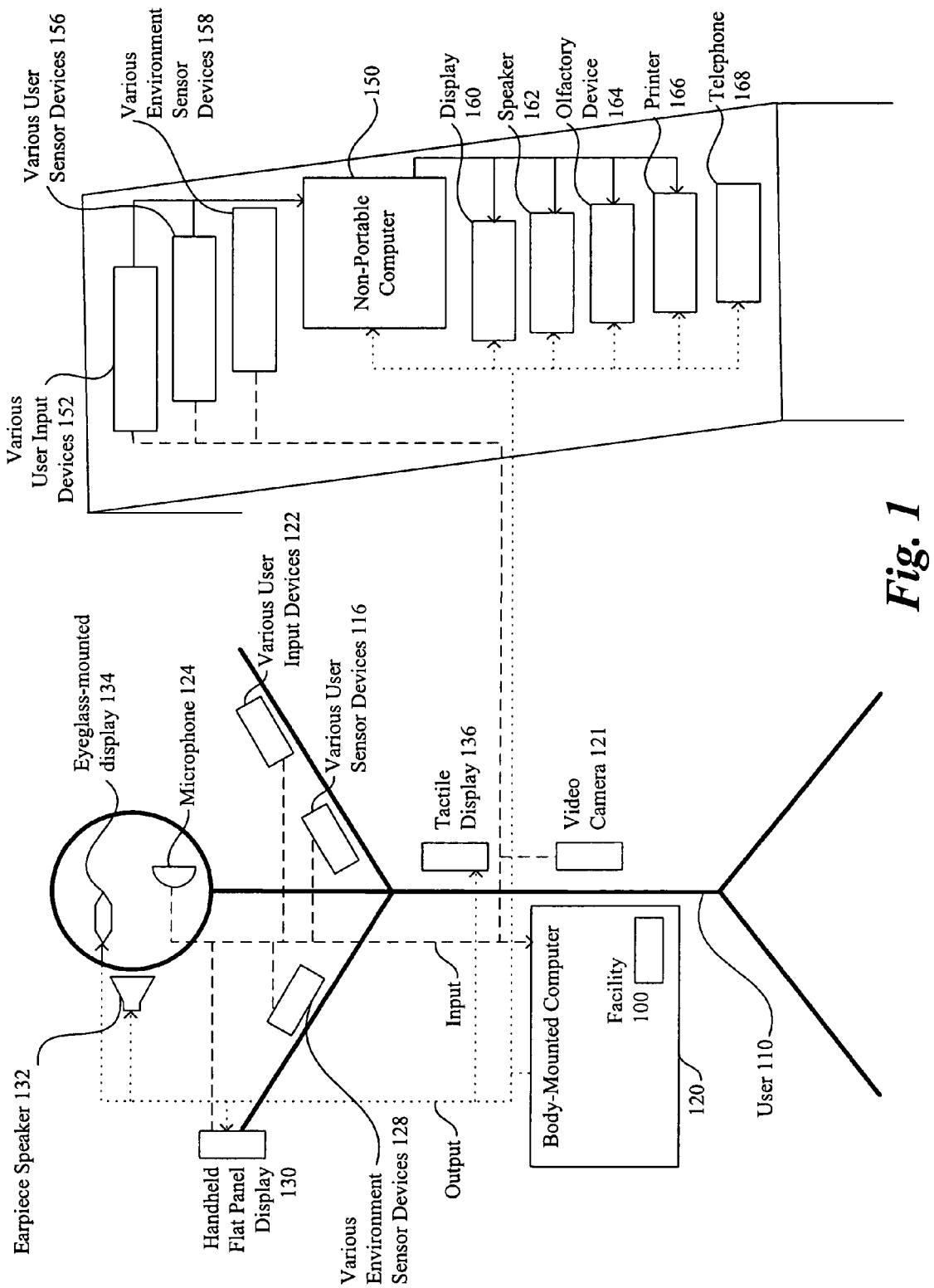
FIG. 1 illustrates an embodiment of the facility which executes on a general-purpose body-mounted wearable computer worn by a user.

A software facility for recording, maintaining, and analyzing data regarding user context ("the facility") is provided. In a preferred embodiment, a characterization module operating in a computer system such as a wearable general-purpose computer system obtains context information, in the form of values for individual attributes each modeling an aspect of the wearable computer system, its user, or the surrounding environment, from one or more context servers, and provide it to one or more context clients that consume the context information. The facility, preferably implemented as part of the characterization module, periodically stores values of selected attributes obtained from context servers in a time-indexed log.

The log may be stored in a database, a sparse matrix, or a file of another type, on a storage device that is either local or remote with respect to the computer system. The identity of the logged attributes, as well as the frequency at which each is logged, is preferably configurable, either manually by the user, or by other programs executing on the computer system. The logged attributes are data gathered or derived to characterize the state of the computer system, its user, and the surrounding environment. The logged attributes may be very compact, such as a boolean value, or very voluminous, such as a color image.

The facility preferably further provides configurable pre-logging processing of logged attributes, such as determining whether data specified for logging should actually be logged, transforming data into a new form for logging, and/or combining data from different sources before logging it.

The facility preferably further provides configurable, selective maintenance of logged attribute data, enabling logged data to be compacted, abstracted, or otherwise further processed based on a variety of factors. This enables the facility to retain detailed, voluminous information for a short time, then process the information to reduce the volume of information that is retained for a longer time. In cases where the detailed information is interesting, such processing can be skipped or deferred to retain the detailed information.

The facility preferably further provides analysis of logged attribute data using later-defined analysis techniques. For example, after data has been logged indicating that (1) a user was present in a particular location for a period of time, and that (2) the user thereafter moved away from that location at a particular direction and speed, an analysis technique could be defined and applied to this data to determine that the user waited for and embarked on a mode of transportation that takes on passengers at the logged location and moves in the logged direction at the logged speed.

Additional embodiments of the facility provide retrospective simulation of events represented in logged attribute data by substituting logged values of selected attributes for realtime attribute values in the attribute values provided to context clients by the characterization module. Such simulations may be conducted for a variety of purposes, including for training, to demonstrate how context clients perform in a particular situation, for usability texting, for debugging, or to repeat an experience represented by logged data. By modifying the logged data used in a simulation beforehand, the user can modify the represented experience. Indeed, completely new experiences may be presented to the user by manufacturing logged data that represent such new experiences.

In this way, the facility makes it possible to preserve, review, and analyze, and simulate historical context data. This enables programs executing on the computer system to make observations, and even judgments, in the present that are predicated on an understanding of events that occurred in the past, and to take initiative to assist the user on this basis. It also enables programs executing on the computer system to evaluate and understand in a retrospective context, rather than merely in an instantaneous context.

FIG. 1 illustrates an embodiment of the facility 100 which executes on a general-purpose body-mounted wearable computer 120 worn by a user 110. Many wearable computers are designed to act as constant companions and intelligent assistants to a user, and are often strapped to a user's body or mounted in a holster. The computer system may also be incorporated in the user's clothing, be implanted in the user, follow the user, or otherwise remain in the user's presence. In one preferred embodiment the user is human, but in additional preferred embodiments, the user may be an animal, a robot, a car, a bus, or another entity whose context is to be logged. Indeed, the computer system may have no identifiable user, but rather operate as an independent probe, logging and/or reporting on the context in an arbitrary location.

The wearable computer 120 has a variety of user-worn user input devices including a microphone 124, a hand-held flat panel display 130 with character recognition capabilities, and various other user input devices 122. Similarly, the computer has a variety of user-worn output devices that include the hand-held flat panel display, an earpiece speaker 132, an eyeglass-mounted display 134, and a tactile display 136. In addition to the various user-worn user input devices, the computer can also receive information from various user sensor input devices 116 and from environment sensor input devices 128, including video camera 121. The characterization module can receive and process the various input information received by the computer, such as from context servers that process the input information and generate attribute values, and can present information to the user on the various output devices accessible to the computer.

In the current environment, computer 120 is accessible to a computer 150 (e.g., by being in wireless proximity or by being reachable via a long-distance communication device such as a cellular phone) which also has a variety of input and output devices. In the illustrated embodiment the computer 150 is non-portable, although the body-mounted computer of the user can similarly communicate with a variety of other types of computers, including body-mounted computers of other users. The devices from which the non-portable computer can directly receive information include various user input devices 152 and various user sensor input devices 156. The non-portable computer can output information directly to a display 160, a speaker 162, an olfactory device 164, and a printer 166. In the illustrated embodiment, the body-mounted computer can communicate with the non-portable computer via a wireless transmission medium. In this manner, the characterization module can receive information from the user input devices 152 and the user sensor devices 156 after the information has been transmitted to the non-portable computer and then to the body-mounted computer. Alternately, the body-mounted computer may be able to directly communicate with the user input devices 152 and the user sensor devices 156, as well as with other various remote environment sensor input devices 158, without the intervention of the non-portable computer 150. Similarly, the body-mounted computer may be able to supply output information to the display 160, the speaker 162, the olfactory device 164, and the printer 166, either directly or via the non-portable computer, and directly to the telephone 168. As the user moves out of range of the remote input and output devices, the characterization module will be updated to reflect that the remote devices are not currently available.

The various input devices allow the characterization module or an application such as a context server (not shown) executing on the computer system 120 to monitor the user and the environment and to model their current condition. Such a model can be used by various applications, such as context clients, for various purposes. A model of the current conditions can include a variety of condition variables that represent information about the user, the computer, and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to myself and my family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the current conditions can additionally include information added explicitly from other sources (e.g., application programs), as well as user-specified or system-learned defaults and preference information.

Those skilled in the art will appreciate that computer systems 120 and 150, as well as their various input and output devices, are merely illustrative and are not intended to limit the scope of the present invention. The computer systems may contain additional components or may lack some illustrated components. For example, it is possible that the characterization module can be implemented on the non-portable computer, with the body-mounted computer replaced by a thin context client such as a transmitter/receiver for relaying information between the body-mounted input and output devices and the non-portable computer. Alternately, the user may not wear any devices or computers.

In addition, the body-mounted computer may be connected to one or more networks of other devices through wired or wireless communication means (e.g., wireless RF, a cellular phone or modem, infrared, physical cable, a docking station, etc.), either with or without support from other computers such as the computer 150. For example, the body-mounted computer of a user can make use of output devices in a smart room, such as a television and stereo when the user is at home, if the body-mounted computer can transmit information to those devices via a wireless or wired medium or if a cabled or docking mechanism is available. Alternately, kiosks or other information devices can be installed at various locations (e.g., in airports or at tourist spots) to transmit relevant information to body-mounted computers within the range of the information device.

Those skilled in the art will also appreciate that specialized versions of the body-mounted computer and characterization module can be created for a variety of purposes.

Figure 2:
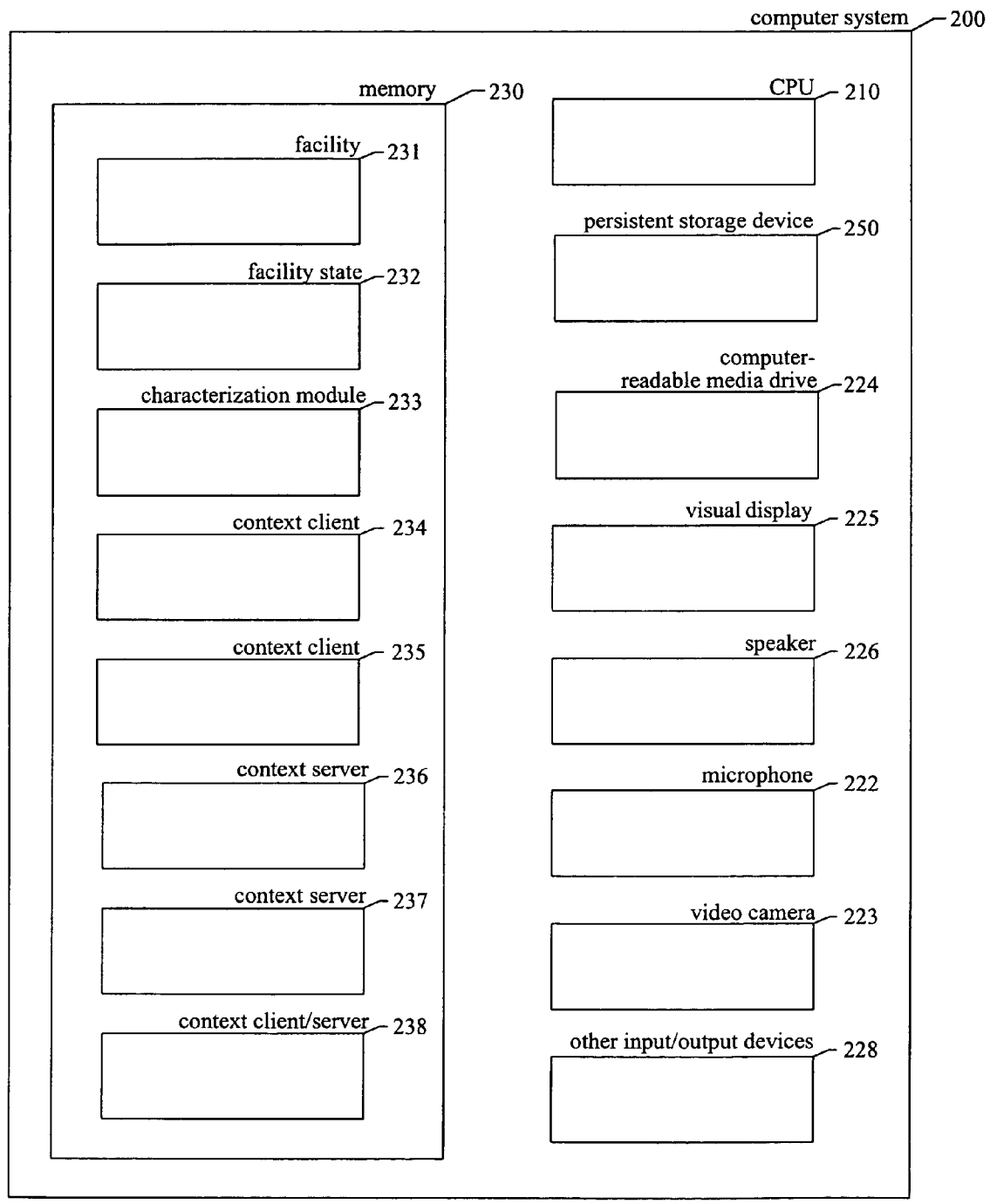
FIG. 2 illustrates an exemplary computer system on which an embodiment of the facility is executing.

FIG. 2 illustrates an exemplary computer system 200 on which an embodiment of the facility is executing. The computer includes a memory 230, a CPU 210, a persistent storage device 250 such as a hard drive, and input/output devices including a microphone 222, a video camera 223, a computer-readable media drive 224, such as a CD-ROM drive, a visual display 225, a speaker 226, and other devices 228. The memory preferably contains the facility 231, as well as information reflecting the current state of the facility (facility state) 232. The memory further contains characterization module 233, software modules 234, 235, and 238 that consume attributes and are therefore context clients, and software modules 236, 237, and 238 which provide attributes and are therefore context servers. While items 231-238 are preferably stored in memory while being used, those skilled in the art will appreciate that these items, or portions of them, can be transferred between memory and the persistent storage device for purposes of memory management and data integrity.

Attributes represent measures of specific context elements such as ambient temperature, location and current user task. Each attribute preferably has the following properties: a name, a value, an uncertainty level, units, and a time stamp. Attributes provided through the characterization module by a context server may either be "measured," in that they are directly received from an input device, or "derived," in that they are the result of performing processing on values directly obtained from input devices other attributes. Indeed, a derived attribute may be produced by performing additional processing on other derived attributes. Context servers, in addition to providing attributes through the characterization module, may also provide other functions. For example, an application, such as an electronic mail application, may serve as a context server by providing attributes through the characterization module. In addition to the source of attributes described above, such an "expanded" context server may provide attributes relating to the other functions of the expanded context server. For example, an electronic mail application context server could provide an attribute indicating other new messages are waiting. Indeed, the same program module may operate both as a context client and a context server.

Two or more different context servers may preferably supply to the characterization module their own values for a single attribute. For example, a first context server can supply a value for a user.location attribute based on data received from a global positioning system device, while a second context server can supply a value for the user.location attribute based on data received from an indoor positioning device. These alternate values for the same attribute provided by different context servers are referred to as separate "instances" of the attribute. Separate instances of an attribute provided by different context servers may be based on data obtained from the same sensor, or may be based on data obtained from different sensors. The characterization module preferably provides a variety of different approaches, called "mediators," for determining, when an attribute requested by a context client has more than one instance, what attribute value to provide in response to the attribute request.

When the characterization module obtains an attribute value from a context server, it preferably caches it for responding to future requests for the attribute from context clients. Such attribute requests may specify a specific instance of the attribute—that is, a specific context server from which the attribute is to be obtained—or may specify that the attribute is to be obtained by applying a particular mediator to whatever instances of the attribute are available, or may utilize a default mediator to mediate between available instances of the attribute. When the characterization module receives an attribute request from a context client, it identifies the attribute instances available to satisfy the request, and, for each, determines whether the value for the attribute instance cached by the characterization module was obtained sufficiently recently from the corresponding context server. If not, the characterization module requests an updated value for the attribute instance from the corresponding context server before performing any necessary mediation and returning a value to the context client.

The facility preferably supports the collaborative logging, in which attribute values produced in multiple computer systems are logged in a single consolidating computer system and there analyzed, or in which values logged in multiple computer systems are maintained, analyzed, or simulationed in a single consolidating computer system. Such collaborative logging is valuable where multiple computer systems are collecting and processing information about the same general subject. For example, information about a military battle collected and processed by separate computer systems carried by each of a number of soldiers may preferably by consolidated and analyzed by the facility in a strategist's computer system.

The characterization module preferably utilizes a plain-language, hierarchical, taxonometric attribute nomenclature to name attributes. The attribute names within the nomenclature are preferably specific so that there is no ambiguity as to what they represent. The characterization module preferably supports the extension of the nomenclature by adding new attribute names that conform to the hierarchical taxonomy of the nomenclature. The nomenclature preferably has attribute names relating to the user, such as user.position, user.speed, and user.direction, providing information about the user's position, speed, and direction, respectively. The nomenclature preferably contains attribute names for various user moods, or "affect," such as user.mood.happiness, user.mood.anger, and user.mood.confusion. The nomenclature preferably includes attribute names for user activities, such as user.activity.driving, user.activity.eating, and user.activity.sleeping. The nomenclature preferably includes attribute names for user physiology values, such as user.physiology.pulse, user.physiology.body_temperature, and user.physiology.blood_pressure. The nomenclature preferably includes attribute names for similar attributes of people other than the user, such as person.John_Smith.mood.happiness. The nomenclature preferably includes attribute names for aspects of the computer system or "platform." For example, the nomenclature preferably includes attribute names for aspects of the platform's user interface, such as platform.user_interface.oral_input_device_availability and platform.user_interface.visual_output_device_availability. The nomenclature preferably includes attribute names for attributes relating to the central processing unit, or "CPU," of the platform, such as platform.cpu_load and platform.clock_speed. The nomenclature preferably also provides attribute names for aspects of the local environment, such as environment.local.time, environment.local.temperature, and environment.local.ambient_noise_level. The nomenclature preferably also includes attribute names for remote environments, such as environment.place.chicago.time and environment.place.san_diego.temperature. The nomenclature preferably further provides attribute names relating to specific applications. For example, the nomenclature preferably provides attribute names for aspects of an electronic mail application, such as application.mail.available, application.mail.new_messages_waiting, and application.mail.messages_waiting_to_be_sent. The nomenclature preferably further provides attribute names relating to data stored in or accessible to the computer system. The nomenclature preferably further provides attribute names relating to the connectivity of the computer system to other computer systems and similar devices, such as such as connectivity.Internet.available and connectivity.Internet.speed.

A single attribute may preferably be referred to by two or more names in the nomenclature. For example, the attribute names person.John_Smith.mood.happiness and user.mood.happiness may refer to the same attributes in a computer system whose user is John Smith.

In this manner, the attribute nomenclature used by the characterization module provides effective names for attributes relating to the user, the computer system, and the environment. Additional detail on the attribute nomenclature utilized by the facility is provided in U.S. patent application Ser. No. 09/724,902, entitled "Dynamically Exchanging Computer User's Context," which is hereby incorporated by reference in its entirety.

Additional embodiments of the facility preferably identify attributes in a variety of ways other than the plain-language, hierarchical, taxonometric attribute nomenclature discussed above. For example, attributes may be identified by arbitrary identifiers, or by the identity of associated events or messages.

Additional details of the operation of the characterization module to obtain attribute values from context servers is provided by U.S. Pat. No. 6,920,616 entitled "Interface for Exchanging Context Data", which is hereby incorporated by reference in its entirety.

Figure 3:
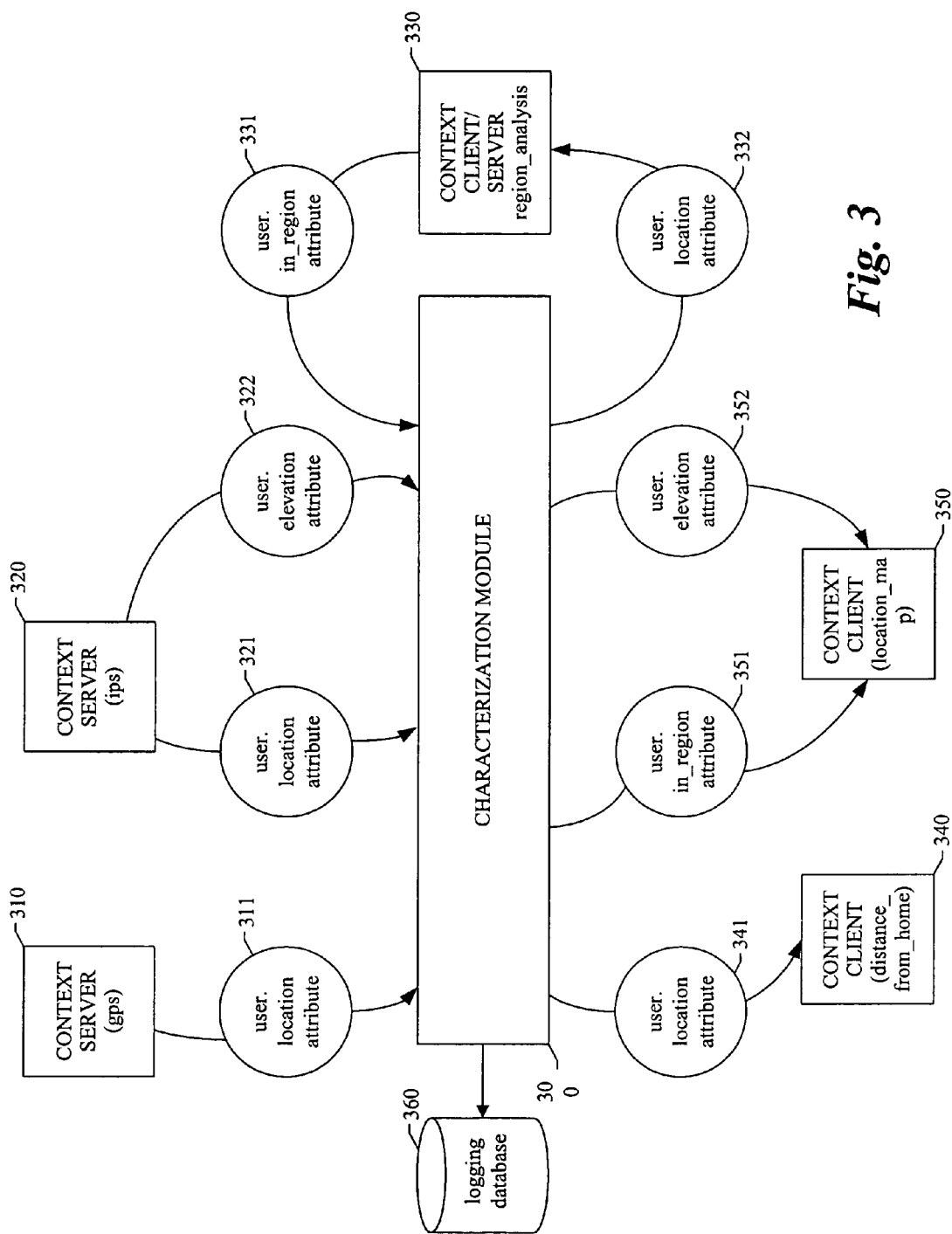
FIG. 3 is a data flow diagram showing a sample exchange of attributes performed by the characterization module.

FIG. 3 is a data flow diagram showing a sample exchange of attributes performed by the characterization module. The diagram shows characterization module 300, as well as five other software modules, 310, 320, 330, 340, and 350. Software modules 310, 320, and 330 are said to be context servers, in that they provide attributes to the characterization module. For example, context server 330 provides an user.in_region attribute 331. It can be seen that context servers may provide more than one attribute. For example, context server 320 provides a user.location attribute 321 and an user.elevation attribute 322. It can further be seen that a single attribute may be provided by more than one context server. For example, context server 310 provides user.location attribute 311, while context server 320 provides user.location attribute 321.

The diagram further shows the facility storing attribute instance values obtained from context servers by the characterization modules in a logging database 360 that is comprised of one or more attribute instance logs.

FIG. 4 is a data structure diagram showing an attribute instance table in which the characterization module caches attribute instance values. The attribute instance table contains a row for each attribute instance created by a context server. The attribute instance table 400 contains rows 401-404, each corresponding to a different attribute instance. Each of these rows contains the following fields: an attribute name field 411 containing the name of the attribute, a context server name field 412 identifying the context server that created the attribute instance, a value field 413 containing the value of the attribute last provided by the context server, and uncertainty field 414 identifying the level of uncertainty of the value, a timestamp 415 indicating the time at which the value is effective, a units field 416 identifying the units for the value and the uncertainty, and an indication 417 of the number of context clients consuming the attribute instance. For example, row 401 indicates that an instance of the user.location attribute from the gps context server has the effective time of 13:11:04.023 on 2/22/2000. Its value is 47° 36.73' N, 122° 18.43' W degrees and minutes, with an uncertainty of 0° 0.09'. It further indicates that two context clients are presently consuming this attribute instance. It should be noted, as shown, the user's location, expressed in terms of latitude and longitude, is maintained in a single attribute. In alternative embodiments, such a location could be maintained in a larger number of attributes. For example, rather than being maintained in a single user.location attribute, such a location could be distributed across four separate attributes: user.location.latitude.degrees, user.location.latitude.minutes, user.location.longitude.degrees, and user.location.longitude.minutes. The characterization module preferably adds row 404 to the attribute instance table when the location_region_analysis context server calls the CreateAttributeInstance function for the user.in_region attribute.

FIG. 5 is a data structure diagram showing a logging configuration table used by the facility to determine which attribute instances to log and when. The information stored in the logging configuration table may be provided by a variety of sources, including the user, the facility, applications, and other programs running on the computer system. In particular, the facility or another program may dynamically determine that a particular attribute instance should be logged, and accordingly add a logging configuration record to the logging configuration table. For example, a program may determine that an altitude parameter should be logged when it observes that the user's location corresponds to the location of a helipad.

The logging configuration table 500 has two rows 501 and 502. Each row corresponds to a particular attribute instance and specifies details of how that attribute instance is to be logged. Each row preferably contains a log name field 511 naming the logging which values of the attribute instance are to be stored; an attribute name field identifying the attribute name of the attribute instance to be logged; a context server name field 513 identifying the context server that is the source of the attribute instance to be logged; a logging frequency field 514 indicating the interval at which the attribute instance is to be logged; a maximum attribute value age field 515 indicating the maximum age of a cache value of the attribute instance that may be logged; an importance level field 516 indicating the importance of maintaining logged data for the attribute instance; a pre-logging processing field 517 indicating any processing to be performed on the attribute instance before storing in the log; a maintenance processing field 518 indicating any maintenance processing to be performed on log values of the attribute instance while they are stored in the log; and a last logged field 519 indicating the time at which the attribute instance was most recently logged.

For instance, row 502 indicates that the instance of the user.in_region attribute supplied by the location_region_analysis context server is to be logged in the user_log log. While only one unique log name is shown in the logging configuration table, the use of the log name field enables the facility to log different attribute instances in different logs, for instance, when the attribute instances relate to different subjects, or where the information contained in the attribute instances belongs to different entities. Row 502 further indicates that this attribute instance is to be logged every ten minutes, and that a cached value for this attribute instance may be logged, rather than obtaining a fresh value from the context server, if the effective time of the cached value is less than 30 seconds before the logging time. Row 502 further indicates that the importance level of maintaining log data for this attribute instance is six, an intermediate importance level. A high importance level may preferably be attributed to a particular attribute based on such factors as whether logging the attribute is legally required or required by a business policy, or whether the attribute has implications for the user's safety. Row 502 further indicates that logging of this attribute instance should be omitted where the current value of the attribute instance matches the last-logged value of the attribute instance. In contrast, because row 501 specifies a maximum attribute value age of 00:00:00.000, the facility must request a fresh value for the instance of the user.location attribute obtained from the GPS context server each time the attribute instance is to be logged. Row 502 indicates that the logged information for this attribute instance is to be summarized weekly, for example, by removing the rows from the log that indicate that the value of this attribute instance has changed during the previous week, and replacing them with a single row indicating the total number of times that the value of this attribute instance changed during the week. Other summarization techniques may summarize the number of times that the user was at each of a number of common locations, such as work, home, and health club. Row 502 further indicates that this attribute instance was last logged at 14:04:36.121 on 2/22/2000. Based on the contents of fields 514 and 519, this attribute instance is scheduled to be next logged at 14:14:36.121 on 2/22/2000.

Figure 6:
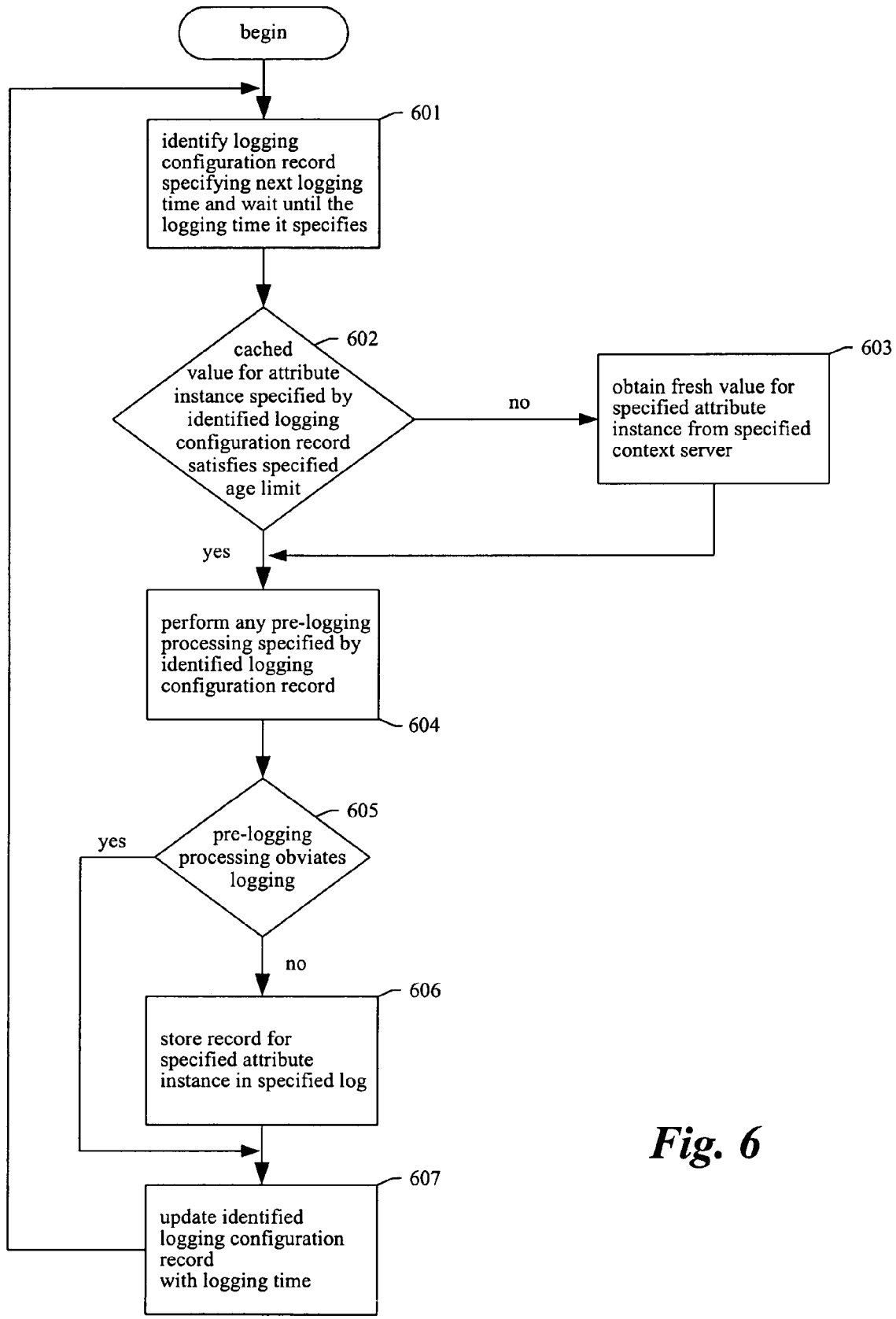
FIG. 6 is a flow diagram showing the steps preferably performed by the facility in order to log attribute instances.

FIG. 6 is a flow diagram showing the steps preferably performed by the facility in order to log attribute instances. In step 601, the facility identifies the logging configuration record specifying the next logging time. By examining FIG. 5, it can be determined that the logging configuration record shown in row 501 has the next logging time, which is 14:07:10.011 on 2/22/2000. In step 601, the facility further waits until this next logging time arrives. In step 602, if the value cached in the characterization module for the attribute instance specified by the logging configuration record identified in step 601 satisfies the maximum attribute value age limit specified by this logging configuration record, then the facility continues in step 604, else the facility continues in step 603. In step 603, the facility uses the characterization module to obtain a fresh value of the specified attribute instance from the specified context server. For example, the facility uses the characterization module to obtain a fresh value of the user.location attribute from the GPS context server. In a further preferred embodiment, the facility in steps 602-603 may use a characterization module operating in a different computer system to obtain a value for the logged attribute instance. That is, the facility may log attributes obtained in computer systems other than the one in which the facility is executing.

After step 603, the facility continues in step 604. In step 604, the facility performs any pre-logging processing specified by the identified logging configuration record. Examples of pre-logging processing techniques preferably supported by the facility include summarization, in which several values of one attribute instance, or values of a number of different attribute instances are summarized in a single log record; abstraction, in which the value of one or more attribute instances, are abstracted into a higher-level conceptualization; and compression, in which information to be stored in the log record is modified to fit in a smaller space.

In step 605, if the pre-logging processing performed in step 604 obviates the current logging iteration, then the facility continues in step 607 to abort the current logging iteration, else the facility continues in step 606. In step 606, the facility stores a record for the specified attribute instance in the specified log. Those skilled in the art will appreciate that the facility may be straightforwardly adapted to support additional techniques of a similar nature. To maximize the accessibility of the data stored in the log, the log record is preferably stored as tab-delimited ASCII text or another widely-supported format. The contents of a stored log record are discussed further in conjunction with FIG. 7 below. After step 606, the facility continues in step 607. In step 607, the facility updates the last logged field of the logging configuration record with the current time. After step 607, the facility continues in step 601 to identify the logging configuration record specifying the next logging time.

FIG. 7 is a data structure diagram showing an attribute log table produced by the facility. The attribute log table 700 contains rows 701-704, each corresponding to a single logged value of an attribute instance. Each row contains an attribute name field 711 indicating the attribute name of the logged attribute instance; a context field server field 712 identifying the context server from which the attribute instance is obtained; a value field 713 containing the logged value for the attribute instance; an uncertainty field 714 indicating the level of uncertainty of the logged value; a time-stamp field 715 indicating the effective time at which the logged value was most accurate; a units field 716 indicating the units in which the value and uncertainty are expressed; a format version field 717 indicating the version of the format in which the value and uncertainty are expressed; a flags field 718 containing additional information about the logged attribute instance; and a logged time field 719 indicating the time at which the value of the attribute instance was logged.

For example, it can be seen from row 704 that the most recently-logged attribute instance is the instance of the user location attribute provided by the GPS context server. The logged value of this attribute instance is 47° 38.72' N, 122° 18.22' W, with an uncertainty of 0°.10'. This attribute instance value has an effective time of 14:05:10.008 on 2/22/2000. The value and uncertainty are expressed in the units of degrees and minutes, the format version is 1.01, and there are no flags stored for attribute instance value. This attribute log record was generated at 14:05:10.011 on 2/22/2000.

Figure 8:
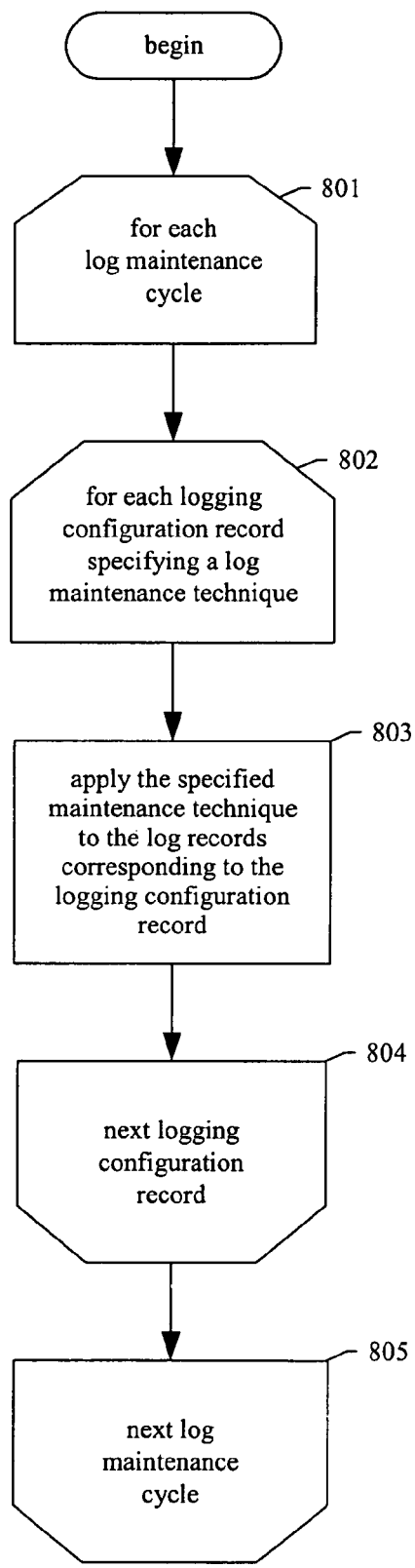
FIG. 8 is a flow diagram showing the steps preferably performed by the facility in order to maintain an attribute log.

FIG. 8 is a flow diagram showing the steps preferably performed by the facility in order to maintain an attribute log. In steps 801-805, the facility loops through each attribute log maintenance cycle. Those skilled in the art will appreciate that the facility could be configured to perform attribute log maintenance cycles at a variety of frequencies, such as every hour, every day, or every month. In steps 802-804, the facility loops through each log configuration record that specifies a maintenance technique in the maintenance processing field 518. In step 803, the facility applies the specified maintenance technique to the log records corresponding to the logging configuration record, which may include log records stored in multiple logs and/or in multiple locations. Examples of maintenance techniques preferably supported by the facility include compression, summarization and abstraction, discussed above; thinning, in which some log records for an attribute instance are deleted from the log, while others are retained in the log; discarding, in which all values of an attribute instance during a particular time period are deleted from the log; and archiving, in which log records for a particular attribute instance are removed from the log and stored in another location, such as on a back-up storage device. Those skilled in the art will appreciate that the facility may be straightforwardly adapted to support additional techniques of a similar nature.

The facility preferably makes decisions regarding when and to which attribute instances to apply maintenance techniques based on a variety of factors, including the relative importance level specified for various attribute instances, as well as other indications of the need to retain the logged information, such as an indication that logging information for a particular attribute instance has become available from another source, such as a database accessible via the Internet.

In step 804, if additional logging configuration records remain, then the facility continues in step 802 to process the next logging configuration record. In step 805, the facility continues in step 801 to process the next context log maintenance cycle.

Figure 9:
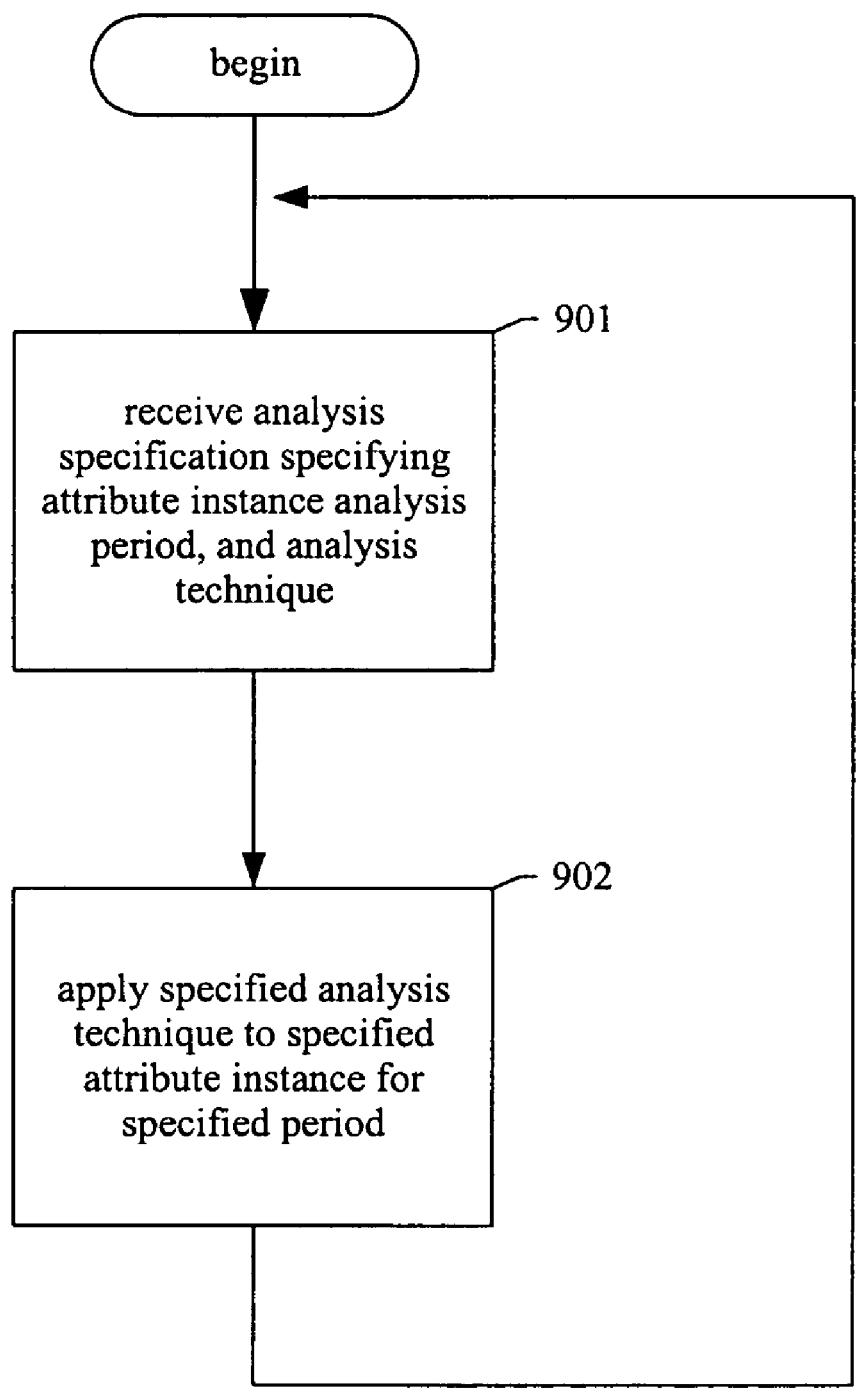
FIG. 9 is a flow diagram showing the steps preferably performed by the facility to analyze log records for attribute instances.

FIG. 9 is a flow diagram showing the steps preferably performed by the facility to analyze log records for attribute instances. In step 901, the facility receives an analysis specification specifying an attribute instance, including the attribute name of the attribute instance and the context server from which the attribute instance is obtained, the time period in which to analyze the logged attribute instance, and an analysis technique. Such a specification may be received from the user via the user interface, or from an application or other program whose functionality includes logged attribute analysis.

Examples of analysis techniques preferably supported by the facility include the following: summarization, discussed above; combination, in which values of several different attribute instances from the same time period are combined; generating a new value of the context attribute that is made available via the characterization module; retrospective application of rules, in which a rule designed to be applied to real-time values of an attribute is applied to logged values of that attribute; and pattern analysis, where recurring patterns are identified in the logged attribute values, or where a pattern is identified in the logged attribute data that matches a pattern specified outside the logged attribute data—for example, matching a series of logged electrocardiogram attribute values to an external electrocardiogram model indicating a high likelihood of heart disease; and ongoing analysis, wherein interim results produced during earlier analysis are retrieved, employed in current processing, augmented, and stored, in some cases separately from the log. Those skilled in the art will appreciate that the facility may be straightforwardly adapted to support additional techniques of a similar nature.

In step 902, the facility applies the specified analysis technique to logged values of the specified attribute instance having effective times during the specified period. After step 902, the facility continues in 901 to receive the next analysis specification.

Figure 10:
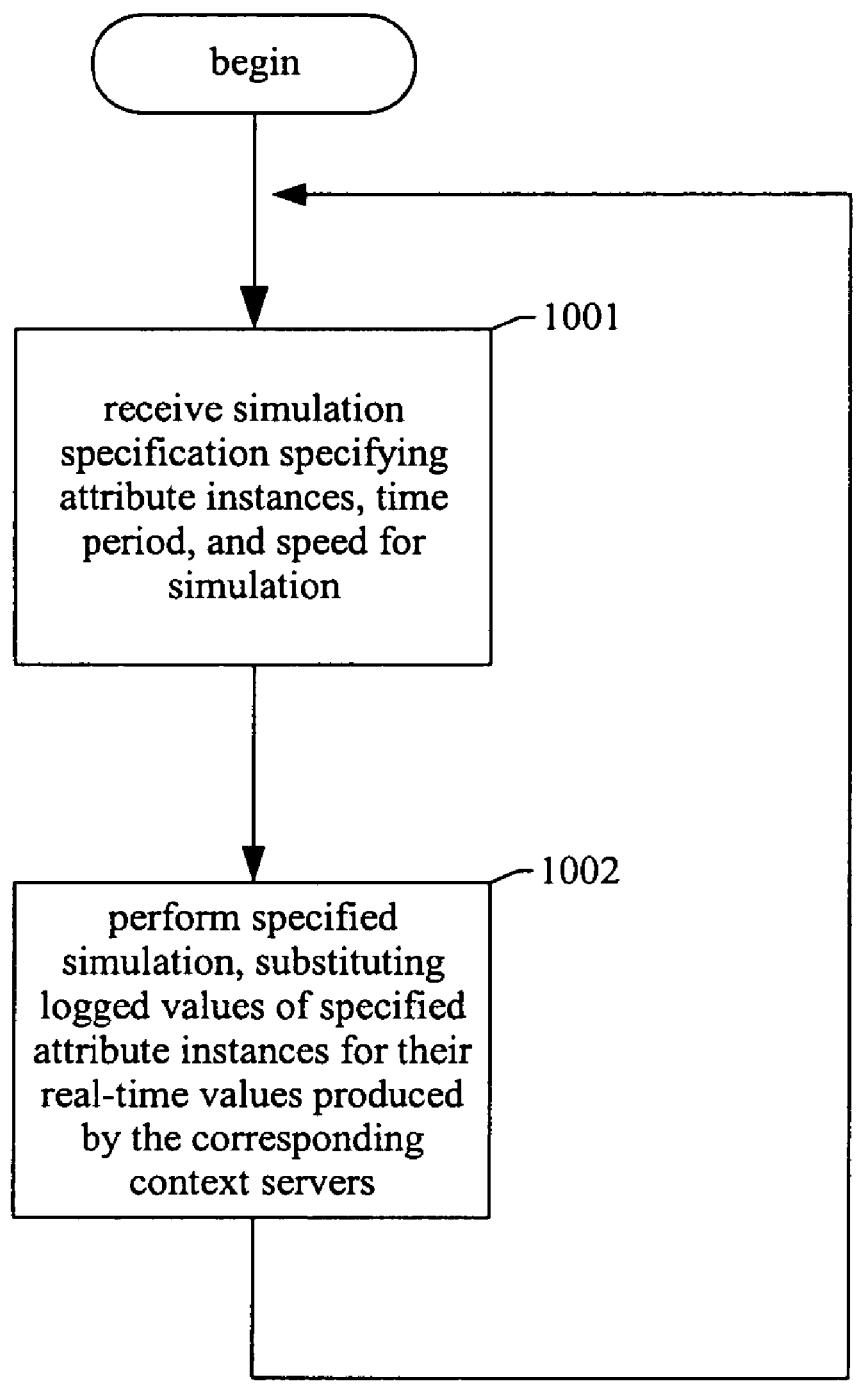
FIG. 10 is a flow diagram showing the steps preferably performed by the facility in order to conduct a context simulation.

FIG. 10 is a flow diagram showing the steps preferably performed by the facility in order to conduct a context simulation. In step 1001, the facility receives a simulation specification specifying one or more attribute instances, a time period, and a speed for a new simulation. Such a specification may be received from the user via the user interface, or from an application or other program whose functionality includes logged attribute analysis. In simulation step 1002, the facility performs the simulation by causing the characterization module to, when it receives a request for one of the specified attribute instances, return a logged value for the attribute instance rather than returning a value for the attribute instance generated in real-time by the corresponding context server. (The characterization module preferably continues to respond to attribute instance requests for other attribute instances with a value for the attribute instance generated in real-time by the corresponding context server. The facility is preferably configurable, however, to disable provision of real-time values for some or all of the other attribute instances.) As the simulation advances in time, the logged times of the logged values that are returned are also advanced in accordance with the specified simulation speed. Simulations may preferably be used for compliance testing or other testing, to repeat an experience, or for other purposes. In one preferred embodiment, scheduled logging is suspended during performance of the simulation in step 1002. After step 1002, the facility continues in step 1001 to receive the next simulation specification.

Figure 11:
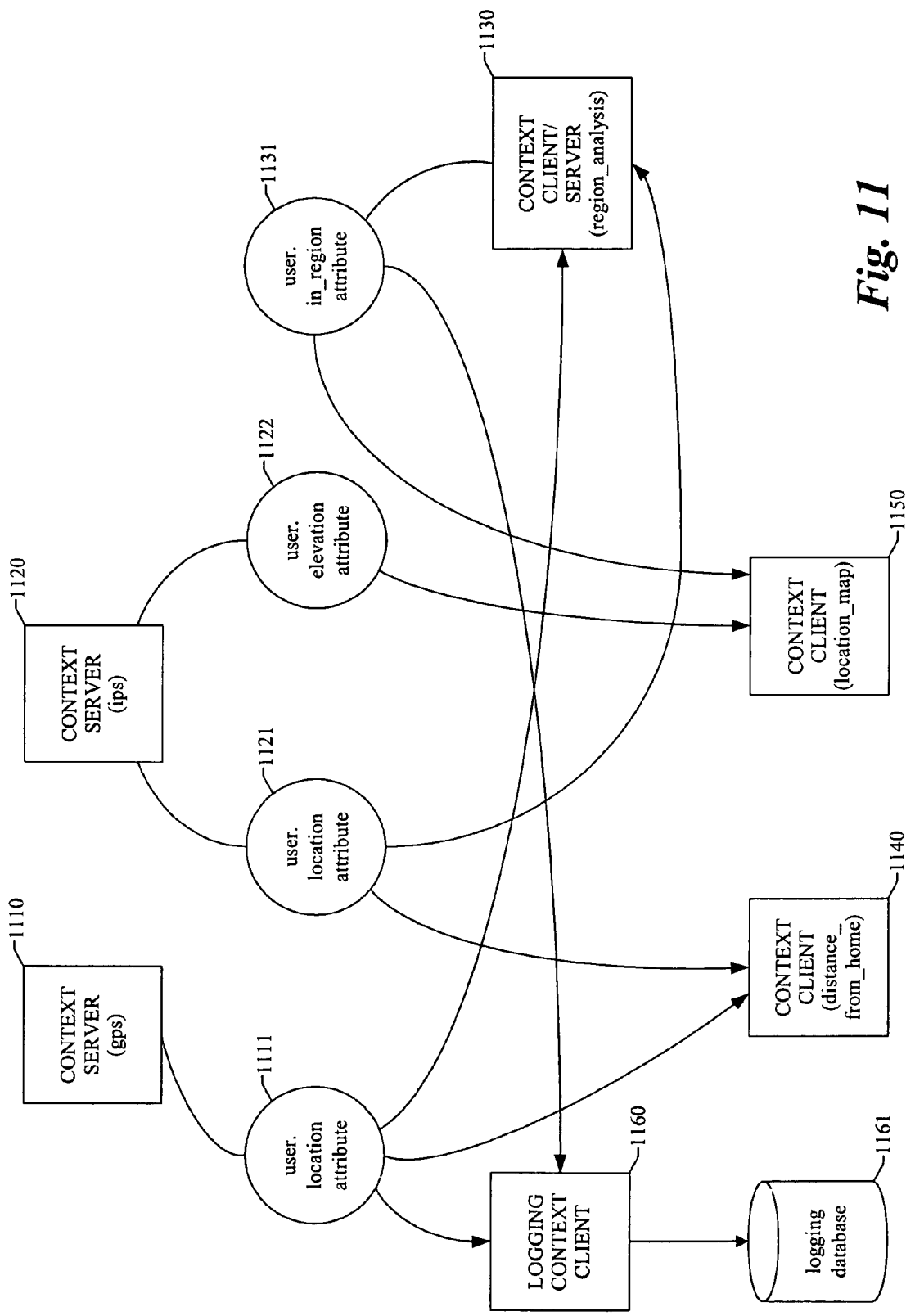
FIG. 11 is a data flow diagram showing the operation of the facility without a characterization module.

FIG. 11 is a data flow diagram showing the operation of the facility without a characterization module. It can be seen in FIG. 11 that context servers 1110, 1120, and 1130 provide attributes directly to context clients 1130, 1140, and 1150. For example, it can be seen that context server 1120 provides a user elevation attribute 1122 directly to context client 1150. In this embodiment, the context client may itself cache attribute values recently obtained from a context server. Further, in this embodiment, context clients may themselves interrogate context servers for an enumeration of their attributes, and mediate between attribute instances provided by different context servers. For example, context client 1140 may mediate between the instance 1111 of the user.location attribute provided by context server 1110 and the instance 1121 of the user.location attribute provided by context server 1120.

In this embodiment, the facility preferably uses a logging context client 1160 to obtain attribute instance values from a context server and store them in a logging database 1161. For example, the diagram shows that the logging context client obtains values of the instance of the user.location attribute supplied by the gps context server and the instance of the in_region attribute supplied by the region analysis context server and stores them in the logging database.

It will be understood by those skilled in the art that the above-described facility could be adapted or extended in various ways. For example, the facility may be implemented in computing devices other than wearable computers, including other types of mobile computing devices, such as personal digital assistants. The facility may further be implemented on various types of stationary and/or distributed computing devices, as well as non-traditional computing devices, such as smart appliances. Further, the facility may use attribute instance tables, logging configuration tables, and attribute log tables of various forms other than those shown above or may maintain its state in ways that do not involve the use of such tables. The facility may also utilize various additional pre-logging processing, log maintenance, and log analysis techniques beyond those described above. In addition to the information discussed above, additional information may be included in a log record, including the values of other attributes. Log records may preferably be ordered and/or indexed based upon any, all, or of the information contained in them.

While the foregoing description makes reference to preferred embodiments, the scope of the invention is defined solely by the claims that follow and the elements recited therein.

We claim:

1. A method in a computing device for specifying context attributes for logging, comprising:
    employing a processor executing computer-executable instructions stored on a computer-reasonable storage medium to implement the following acts:
        displaying a list of context attributes available in the computing device, each context attribute in the list of context attributes having values supplied by one or more data sources;
        caching the values supplied by the one or more data sources as the values are obtained from the data sources;
        receiving a first set of user inputs identifying a subset of context attributes from the list of context attributes for logging;
        receiving a second set of user inputs specifying a logging frequency for each context attribute in the identified subset of context attributes;
        receiving a third set of user inputs specifying a maximum value age for each context attribute in the identified subset of context attributes;
        selecting the identified subset of context attributes for logging;
        for each context attribute in the identified subset of attributes:
            determining an age of a cached value associated with the context attribute at periodic intervals determined by the logging frequency specified for the context attribute;
            determining whether the age of the cached value associated with the context attribute is less than the maximum value age specified for the context attribute;
            logging the cached value associated with the context attribute when it is determined that the age of the cached value associated with the context attribute is less than the maximum value age specified for the context attribute; and
            obtaining a new value from a data source corresponding to the context attribute when it is determined that the age of the cached value associated with the context attribute is greater than the maximum value age specified for the context attribute;
    for each context attribute of the identified subset of selected context attributes, receiving user input identifying a log in which values of the context attribute are to be logged; and
    for each context attribute of the identified subset of context attributes, at periodic times as a function of the logging frequency associated with the context attribute, storing values of the selected context attribute in the log identified for the context attribute.

2. The method of claim 1 wherein a proper subset of the displayed available context attributes is selected.

3. The method of claim 1 wherein a single displayed available context attribute is selected.

4. The method of claim 1 wherein a value of a distinguished one of the selected context attributes is available from each of a plurality of sources, the method further comprising employing a user-specified mediator to one of the sources from which to obtain the value of the distinguished context attribute that is to be logged.

5. The method of claim 4, further comprising receiving user input specifying the source from which to obtain the value of the distinguished context attribute that is to be logged.

6. The method of claim 4, further comprising identifying for a distinguished one of the selected context attributes an alternative source from which new attribute values for the distinguished one of the selected context attributes are likely to become available at a future time.

7. The method of claim 6 wherein the identified alternative source is specified by user input.

8. The method of claim 1, further comprising determining for a distinguished one of the selected context attributes a processing technique to which the distinguished context attribute is to be subjected before logging.

9. The method of claim 8 wherein the determined processing technique is specified by user input.

10. The method of claim 1, further comprising determining for a distinguished one of the selected context attributes a processing technique to which a logged value of the distinguished context attribute is to be subjected at a time subsequent to logging.

11. The method of claim 10 wherein the determined processing technique is specified by user input.

12. The method of claim 1 wherein the displayed list of available context attributes contains context attributes relating to travel.

13. The method of claim 1 wherein the computing device in which the method is performed is a mobile computer system.

14. The method of claim 1 wherein the computing device in which the method is performed is a body-supported computer system.

15. The method of claim 1 wherein the computing device in which the method is performed follows the user to remain in the user's presence.

16. A system for logging context data items, the system comprising:
    at least one computing device for:
        displaying a set of available context data items;
        caching values for the available context data items obtained from respective data sources;
        receiving user input identifying a subset of the available context data items to be logged;
        receiving user input defining a logging frequency for each context data item in the subset of available context data items;
        receiving user input defining a maximum age value for each data item in the subset of available context data items;
        periodically logging a cached value for each context data item in accordance with the respectively defined logging frequencies, wherein logging the cached value comprises:
            determining an age of the cached value for the context data item to be logged;
            determining whether the age of the cached value exceeds the maximum value age defined for the context data item;
            logging the cached value for the context data item when it is determined that the age of the cached value does not exceed the maximum value age defined for the context data item; and
            obtaining a new value for the data item from a data source when it is determined that the age of the cached value exceeds the maximum value age defined for the context data item; and determining whether to retain or discard a logged value of a distinguished one of the context data items in the subset of available data items based on a determined importance level reflecting the importance of retaining the logged value of the distinguished one of the subset of available context data items, wherein the determined importance level is specified by user input.

17. The system of claim 16, wherein the at least one computing device comprises:

a selection module that specifies how values for context data items of the available context data items associated with a computer user are to be logged within a context attribute logging configuration data structure, the selection module allowing a user to associate a logging frequency and a maximum value age for each context data item;

a logging module containing a plurality of entries each corresponding to a logged context attribute value data item and logged in accordance with the data structure; and a characterization module that caches received values for each of the context data item and logs the cached values for each context data item at periodic times as a function of the logging frequency associated with the context data item, wherein a cached value having an age that exceeds the maximum value age associated with its respective context data item is replaced with a newly obtained value from a source of the value prior to logging.

18. The system of claim 17 wherein each entry of the data structure is a record.

19. The system of claim 17 wherein one or more selected entries of the data structure corresponding to a context data item for which values are available from more than one source further specifies a particular source from which to obtain a value for the context data item to which it corresponds.

20. The system of claim 17 wherein each of one or more selected entries of the data structure specifies a processing technique to which a corresponding context data item is to be subjected before logging.

21. The system of claim 17 wherein each of one or more selected entries of the data structure specifies a processing technique to which a corresponding context data item is to be subjected at a time subsequent to logging.

22. The system of claim 17 wherein each of one or more selected entries of the data structure specifies an importance level reflecting an importance of retaining information produced by logging a corresponding context data item.

23. The system of claim 17 wherein each of one or more selected entries of the data structure specifies an alternative source from which a corresponding context data item may become available at a future time.

24. The system of claim 16, wherein:

the system comprises at least one logging component, the logging component periodically logging the cached values, the cached values being logged in an instance of a data structure such that each entry contains at least information identifying a context data item, an effective time, and a value produced for the context data item having the effective time; and each context data item is named following a plain-language, hierarchical, and taxonomic attribute nomenclature.

25. The system of claim 24 wherein each entry further specifies an uncertainty level characterizing the likely level of accuracy in the value of the entry.

26. The system of claim 24 wherein each entry further identifies the time at which the entry was stored.

27. The system of claim 24 wherein each entry further identifies the source of the value of the entry.

28. The system of claim 16, wherein the at least one computing device comprises a plurality of wearable intelligent assistant computers.

29. A computer-readable storage medium whose contents cause a computing device to specify context data items for logging, by performing a method comprising:

displaying a set of available data items;

caching values for the available data items obtained from respective data sources;

receiving user input identifying a subset of the available data items to be logged;

receiving user input defining a logging frequency for each data item in the subset of available data items;

receiving user input defining a maximum age value for each data item in the subset of available data items;

periodically logging a cached value for each data item in accordance with the respectively defined logging frequencies, wherein logging the cached value comprises:

determining an age of the cached value for the data item to be logged;

determining whether the age of the cached value exceeds the maximum value age defined for the data item;

logging the cached value for the data item when it is determined that the age of the cached value does not exceed the maximum value age defined for the data item; and obtaining a new value for the data item from a data source when it is determined that the age of the cached value exceeds the maximum value age defined for the data item; and determining whether to retain or discard a logged value of a distinguished one of the data items in the subset of available data items based on a determined importance level reflecting the importance of retaining the logged value of the distinguished one of the data items in the subset of available data items, wherein the determined importance level is specified by user input.

30. The method of claim 29 wherein the computing device in which the method is performed is a general-purpose mobile computer system.

31. The method of claim 29 wherein the computing device in which the method is performed is a general-purpose wearable computer system.

32. The method of claim 29 wherein the computing device in which the method is performed is a body-supported general-purpose computer system.

* * * * *